US012016108B2

(12) United States Patent
Raider et al.

(10) Patent No.: US 12,016,108 B2
(45) Date of Patent: Jun. 18, 2024

(54) MICROWAVE-ASSISTED STERILIZATION AND PASTEURIZATION SYSTEM USING SYNERGISTIC PACKAGING, CARRIER AND LAUNCHER CONFIGURATIONS

(71) Applicant: 915 Labs, LLC, Centennial, CO (US)

(72) Inventors: Matthew Raider, Denver, CO (US); David Behringer, Denver, CO (US); Li Zhang, Alpharetta, GA (US); Harold Dail Kimrey, Jr., Knoxville, TN (US)

(73) Assignee: 915 Labs, LLC, Centennial, CO (US)

( * ) Notice: Subject to any disclaimer, the term of this patent is extended or adjusted under 35 U.S.C. 154(b) by 297 days.

(21) Appl. No.: 17/216,403

(22) Filed: Mar. 29, 2021

(65) Prior Publication Data

US 2021/0219392 A1 Jul. 15, 2021

Related U.S. Application Data

(63) Continuation of application No. 15/953,646, filed on Apr. 16, 2018, now Pat. No. 10,966,293.

(60) Provisional application No. 62/486,040, filed on Apr. 17, 2017.

(51) Int. Cl.

| | |
|---|---|
| ***H05B 6/78*** | (2006.01) |
| ***H05B 6/70*** | (2006.01) |
| ***H05B 6/80*** | (2006.01) |

(52) U.S. Cl.
CPC ............ *H05B 6/782* (2013.01); *H05B 6/701* (2013.01)

(58) Field of Classification Search
CPC ........... H05B 6/701; H05B 6/78; H05B 6/782
USPC ....... 219/762, 700, 701, 710, 714, 728, 730, 219/746, 750, 759, 679, 686, 691, 699; 426/234, 241, 243
See application file for complete search history.

(56) References Cited

U.S. PATENT DOCUMENTS

2017/0099704 A1* 4/2017 Kimrey, Jr. ........... A47J 36/027
2018/0168200 A1* 6/2018 Knoerzer ............. A61L 2/0064

* cited by examiner

*Primary Examiner* — Quang T Van
(74) *Attorney, Agent, or Firm* — Polsinelli PC; Gregory P. Durbin

(57) ABSTRACT

Processes and systems that enhance the heating of packaged foodstuffs and other items in various microwave heating systems are described herein. It has been unexpectedly found that configuring the microwave heating zone of a microwave-assisted pasteurization or sterilization system so that the article carrier, the microwave launchers, and/or the packages have certain relative dimensions may significantly enhance the uniformity of heating of the articles. The result is pasteurized or sterilized articles that exhibit fewer hot and cold spots, a consistent microbial lethality rate, and desirable end properties, such as visual appearance, taste, and texture.

9 Claims, 13 Drawing Sheets

MICROWAVE-ASSISTED STERILIZATION AND PASTEURIZATION SYSTEM USING SYNERGISTIC PACKAGING, CARRIER AND LAUNCHER CONFIGURATIONS

CROSS-REFERENCE TO RELATED APPLICATIONS

This application is a continuation application and claims priority U.S. Nonprovisional application Ser. No. 15/953,646 filed Apr. 16, 2018, which claims the benefit of priority under 35 U.S.C. § 119 (e) from U.S. Provisional Patent Application No. 62/486,040 filed on Apr. 17, 2017, both of which are hereby incorporated by reference in their entirety.

FIELD OF THE INVENTION

The present invention relates processes and systems for heating articles using microwave energy. In particular, the present invention relates to methods and systems for providing enhanced heating to packaged materials that are pasteurized or sterilized in large-scale microwave heating systems.

BACKGROUND

Microwave radiation is a known mechanism for delivering energy to an object. The ability of microwave energy to penetrate and heat an object in a rapid and effective manner has proven advantageous in many chemical and industrial processes. Because of its ability to quickly and thoroughly heat an article, microwave energy has been employed in heating processes wherein the rapid achievement of a prescribed minimum temperature is desired, such as, for example, pasteurization or sterilization processes. Further, because microwave energy is generally non-invasive, microwave heating may be particularly useful for heating dielectrically sensitive materials, such as food and pharmaceuticals. However, to date, the complexities and nuances of safely and effectively applying microwave energy, especially on a commercial scale, have severely limited its application in several types of industrial processes. Furthermore, achieving efficient, yet uniform, heating of articles that achieves sufficient microbial lethality rates and minimizes thermal degradation of organoleptic properties of the material has proven challenging, particularly on a commercial scale.

A need exists for a microwave heating system suitable for the sterilization or pasteurization of a wide variety of packaged foodstuffs and other items. The system would be capable of providing consistent, uniform, and rapid heating of the articles with a high degree of operational flexibility. Processes performed by such a system would minimize, or even prevent, hot and cold spots in the articles, and ensure the pasteurized and sterilized articles achieve target standards for microbial lethality and overall quality.

SUMMARY

One embodiment of the present invention concerns a microwave heating system for heating a plurality of articles. The microwave heating system comprises at least one carrier comprising a frame formed of a pair of longer spaced apart side members and a pair of shorter spaced apart end members coupled to opposite ends of and extending between the side members, and an upper support member and a lower support member coupled to the frame and defining a cargo volume therebetween. The cargo volume is configured to receive a group of the articles. The microwave heating system comprises a convey line for transporting the carrier in a direction of travel. The side members of the carrier are configured to engage the convey line. The microwave heating system comprises a microwave generator for generating microwave energy having a predominant wavelength (λ); and at least one microwave launcher for directing at least a portion of the microwave energy toward the articles in the carrier being transported along the convey line. The microwave launcher defines one or more launch openings, wherein each of the launch openings has a width and a depth and the width of each launch opening is greater than its depth. The microwave launcher is configured such that the width of each launch opening is aligned substantially parallel to the direction of travel, and the ratio of the width of the cargo volume to the depth of each launch opening is greater than 2.75:1.

Another embodiment of the present invention concerns a carrier and article system for transporting a plurality of articles along a convey line of a microwave heating system. The carrier and article system comprises a frame configured to engage the convey line; upper and lower support structures coupled to the frame and defining a cargo volume therebetween; and a group of articles received in the cargo volume. The articles are arranged in at least two rows each extending along the length of the carrier so that the articles in adjacent rows are spaced apart from one another along the width of the carrier in a side-by-side configuration. At least two of the articles in each row are arranged in a nested configuration such that one article is positioned top up and an adjacent article in the same row is positioned top down and at least a portion of the adjacent articles overlap horizontally. The ratio of the distance between the center points of side-by-side articles in adjacent rows to the width of the cargo volume is at least 0.52:1.

Yet another embodiment of the present invention concerns a process for heating a plurality of articles in a microwave heating system, the process comprising: (a) generating microwave energy having a predominant wavelength (λ); (b) loading a plurality of articles into a carrier, wherein each of the articles has a length (L) and a width (W) with the width being less than the length, and wherein the width of each article is at least 2.75λ; (c) transporting the loaded carrier into a microwave heating chamber along a convey line in a direction of travel, wherein the microwave heating chamber is at least partially filled with a liquid medium; (d) directing at least a portion of the microwave energy toward the articles in the carrier via at least one microwave launcher; and (e) heating the articles in the carrier to provide heated articles, wherein at least a portion of the heating is performed using the microwave energy. The articles are submerged in the liquid medium during the heating. Each of the heated articles has a hottest portion and a coldest portion, and wherein the difference between the maximum temperature of the hottest portion of each article and the minimum temperature of its coldest portion does not exceed 15° C.

BRIEF DESCRIPTION OF THE DRAWINGS

Various embodiments of the present invention are described in detail below with reference to the attached drawing Figures, wherein.

Figure 7A:
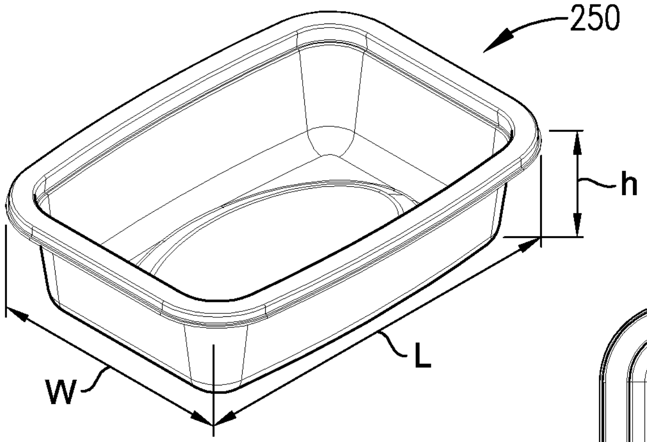

FIG. **7*a*** is an isometric view of a package suitable for use in holding foodstuffs and other items to be heated according to embodiments of the present invention, particularly showing the length, width, and height dimensions of the package;

FIG. **7*b* is a top view of the package shown in FIG. 7*a;***

Figure 7B:
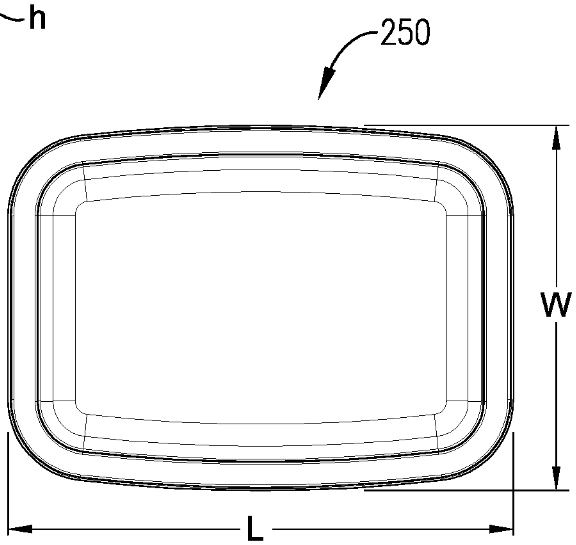

FIG. **7*c* is a side view of the package shown in FIGS. 7*a* and 7*b;***

Figure 7C:
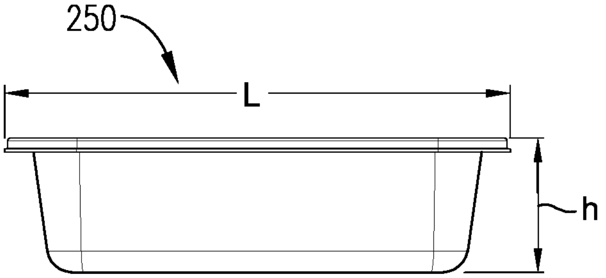
Figure 7D:
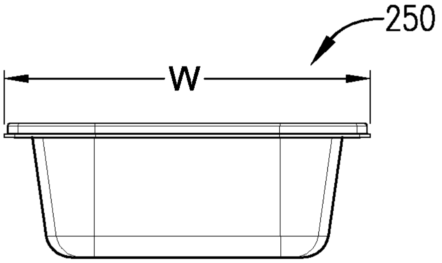

FIG. **7*d* is an end view of the package shown in FIGS. 7*a*-7*c;***

Figure 8:
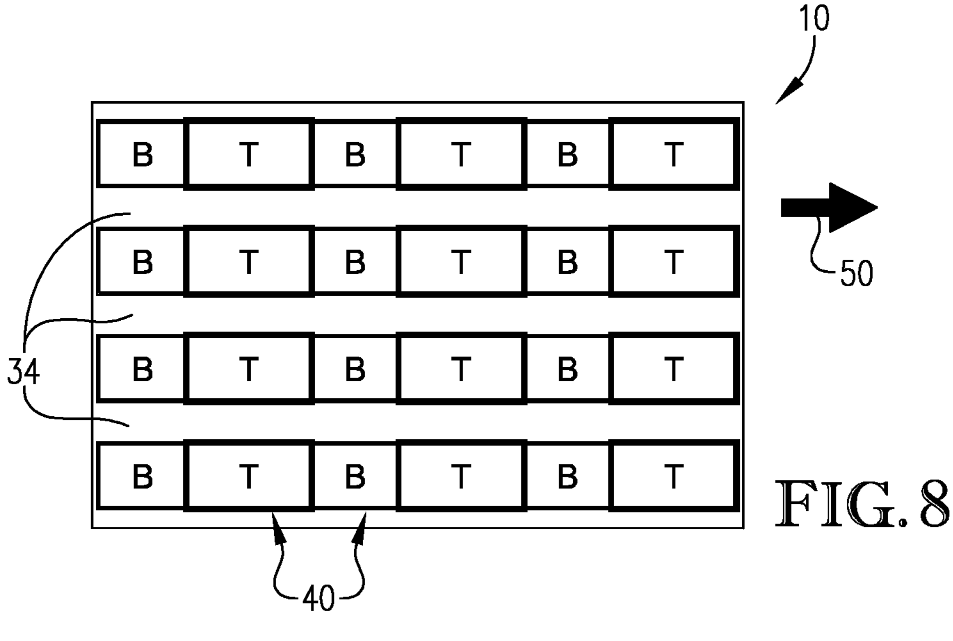
Figure 9:
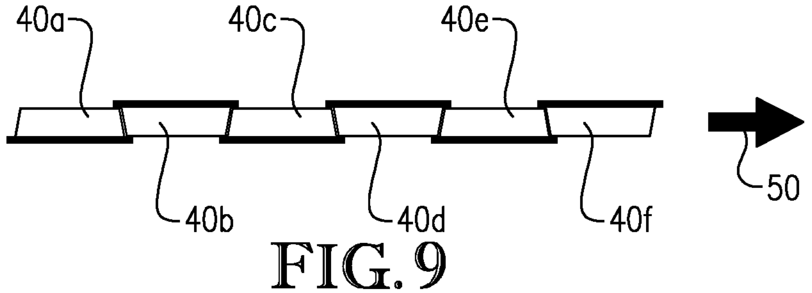
Figure 10:
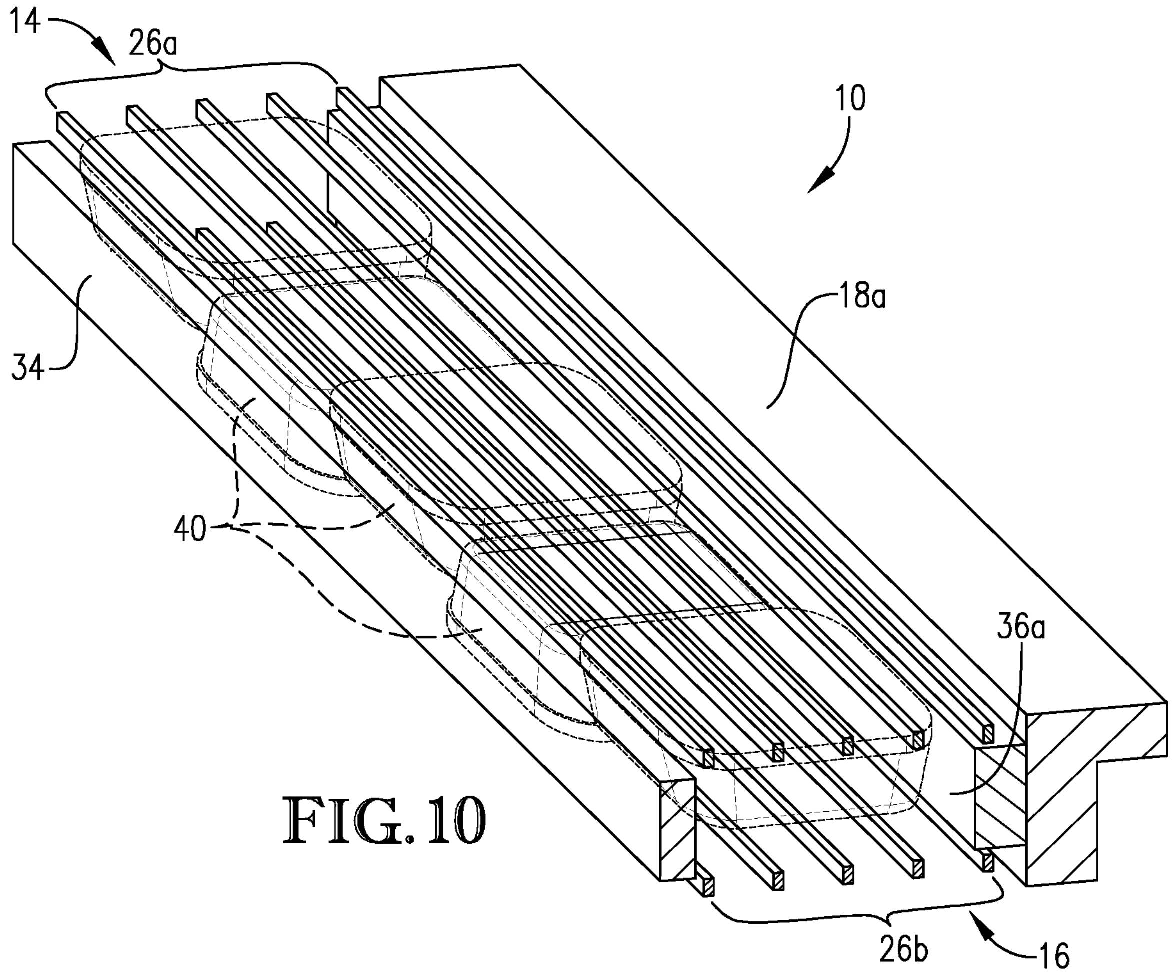
Figure 12B:
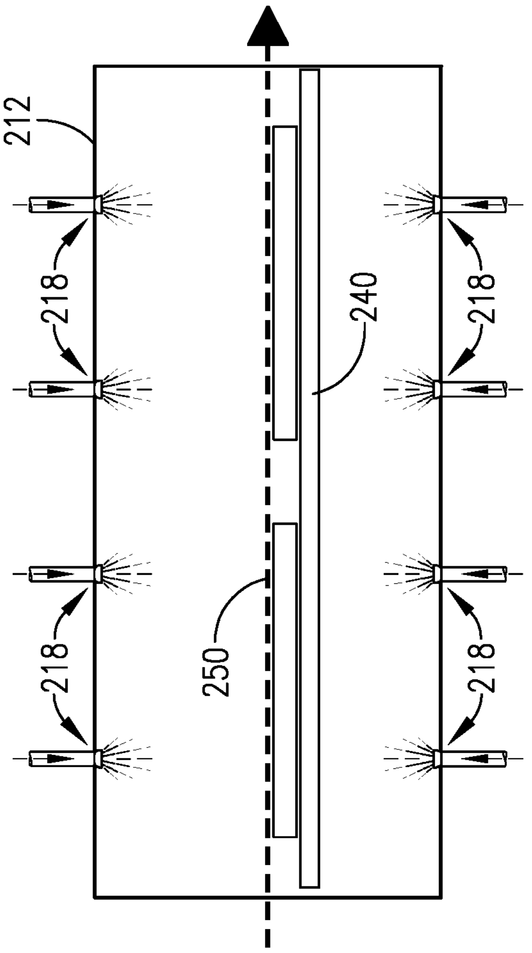
Figure 12A:
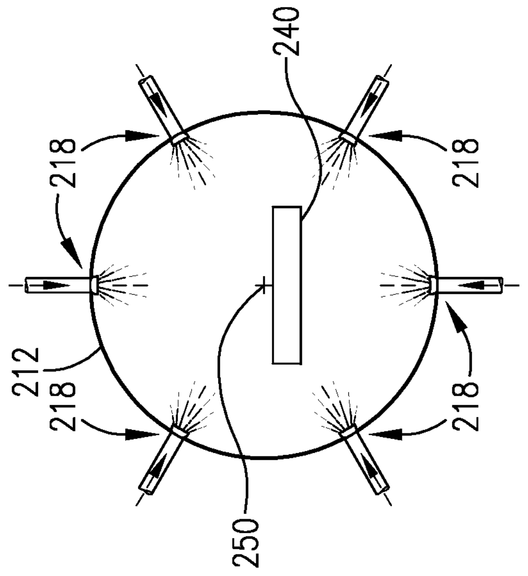

FIG. 8 is a is a top view of a plurality of articles arranged in a nested configuration within a carrier, particularly illustrating a divided row nested configuration;

FIG. 9 is a side view of at least a portion of one row of articles arranged in a nested configuration;

FIG. 10 is a partial isometric view of at least a portion of a row of articles arranged in a nested configuration in one compartment of a carrier defined between the side wall and a divider;

FIG. **11*a*** is a schematic depiction of the major steps of a method for microwave pasteurizing or sterilizing a packaged foodstuff according to embodiments of the present invention;

FIG. **11*b*** is a schematic depiction of the major zones of a system for microwave pasteurizing or sterilizing a packaged foodstuff according to embodiments of the present invention;

FIG. **12*a*** is schematic partial side cut-away view of a thermalization chamber suitable for use in a thermalization zone according to embodiments of the present invention, particularly showing locations of a plurality of fluid jet agitators;

FIG. **12*b* is a schematic end view of the thermalization chamber shown in FIG. 12*a;***

Figure 13:
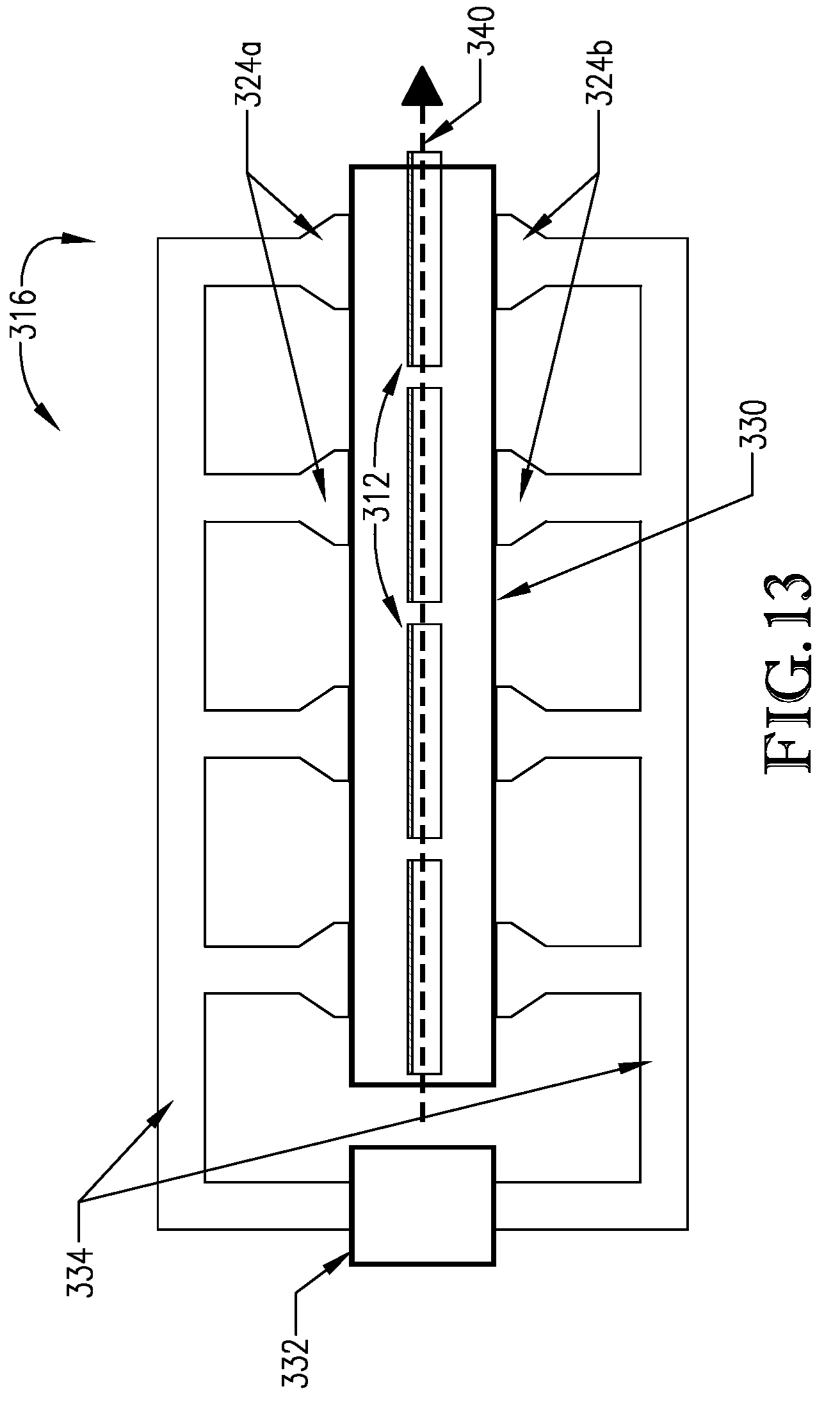
Figure 14A:
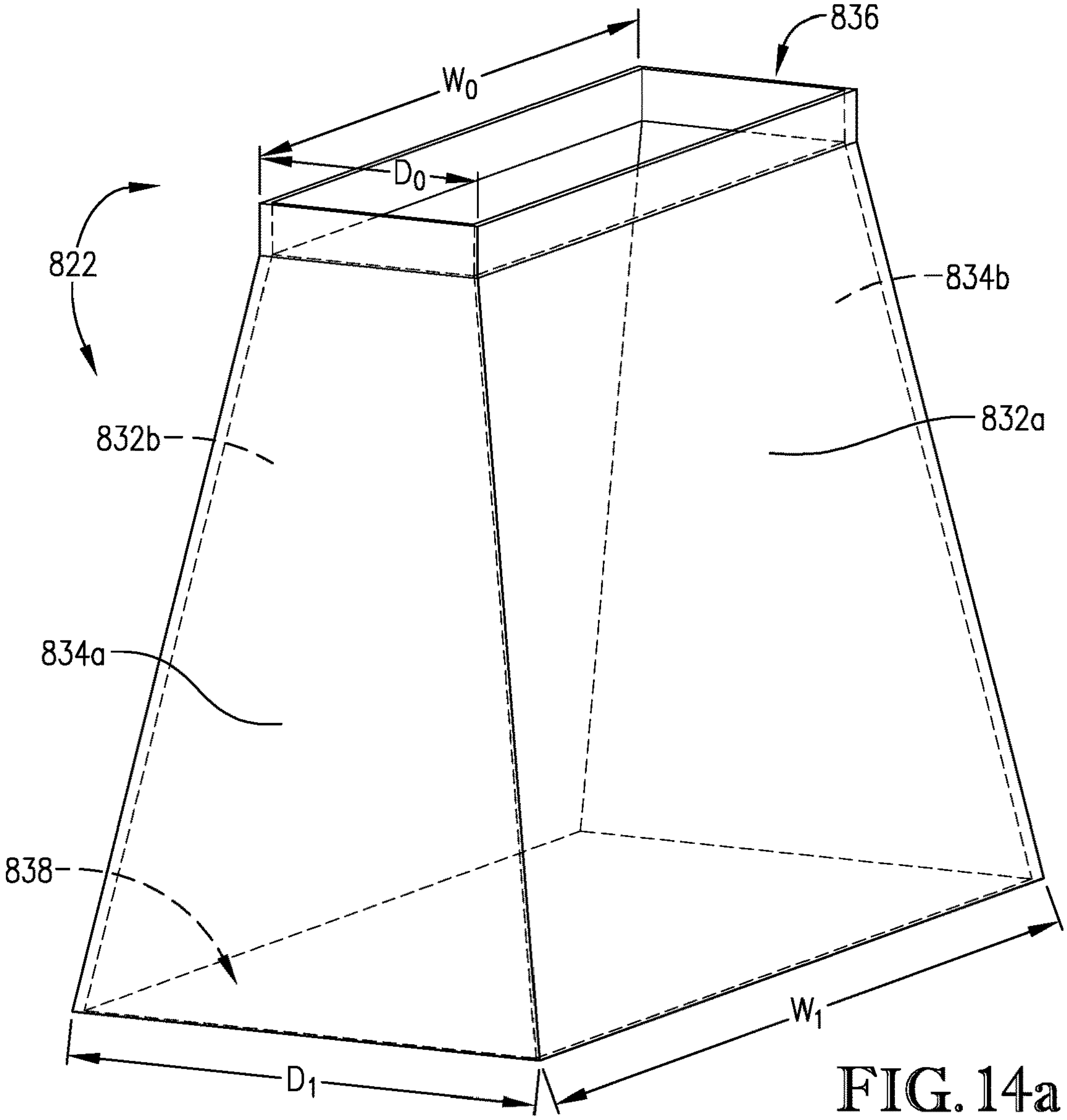

FIG. 13 is a schematic partial side cut-away view of a microwave heating zone configured according to embodiments of the present invention, particularly illustrating one possible arrangement of the microwave heating vessel, the microwave launchers, and the microwave distribution system;

FIG. **14*a*** is an isometric view of a microwave launcher configured according to embodiments of the present invention;

FIG. **14*b* is a longitudinal side view of the microwave launcher depicted in FIG. 14*a;***

Figure 14B:
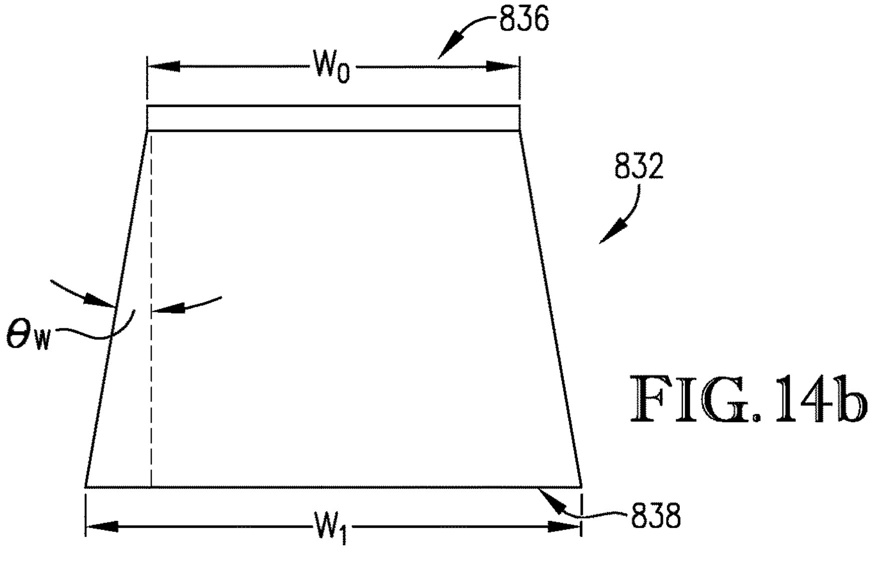
Figure 15:
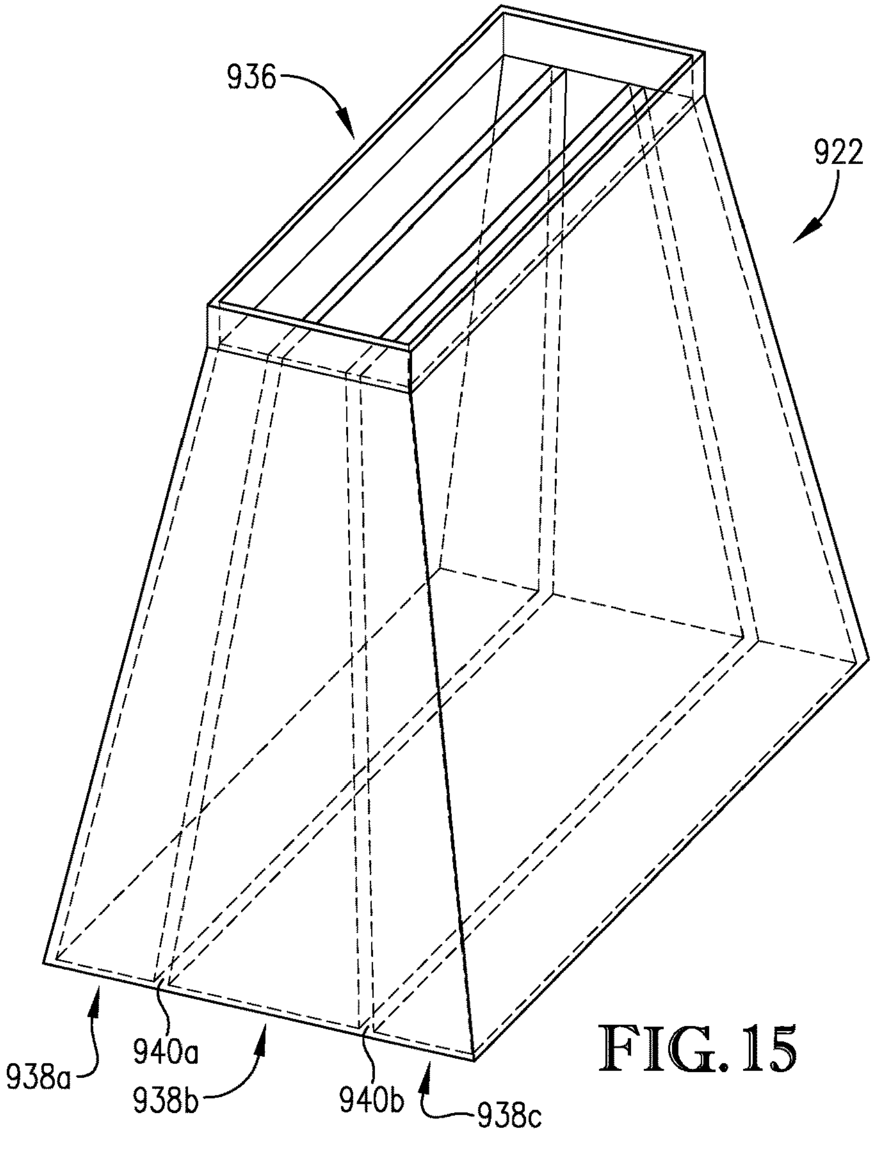
Figure 17:
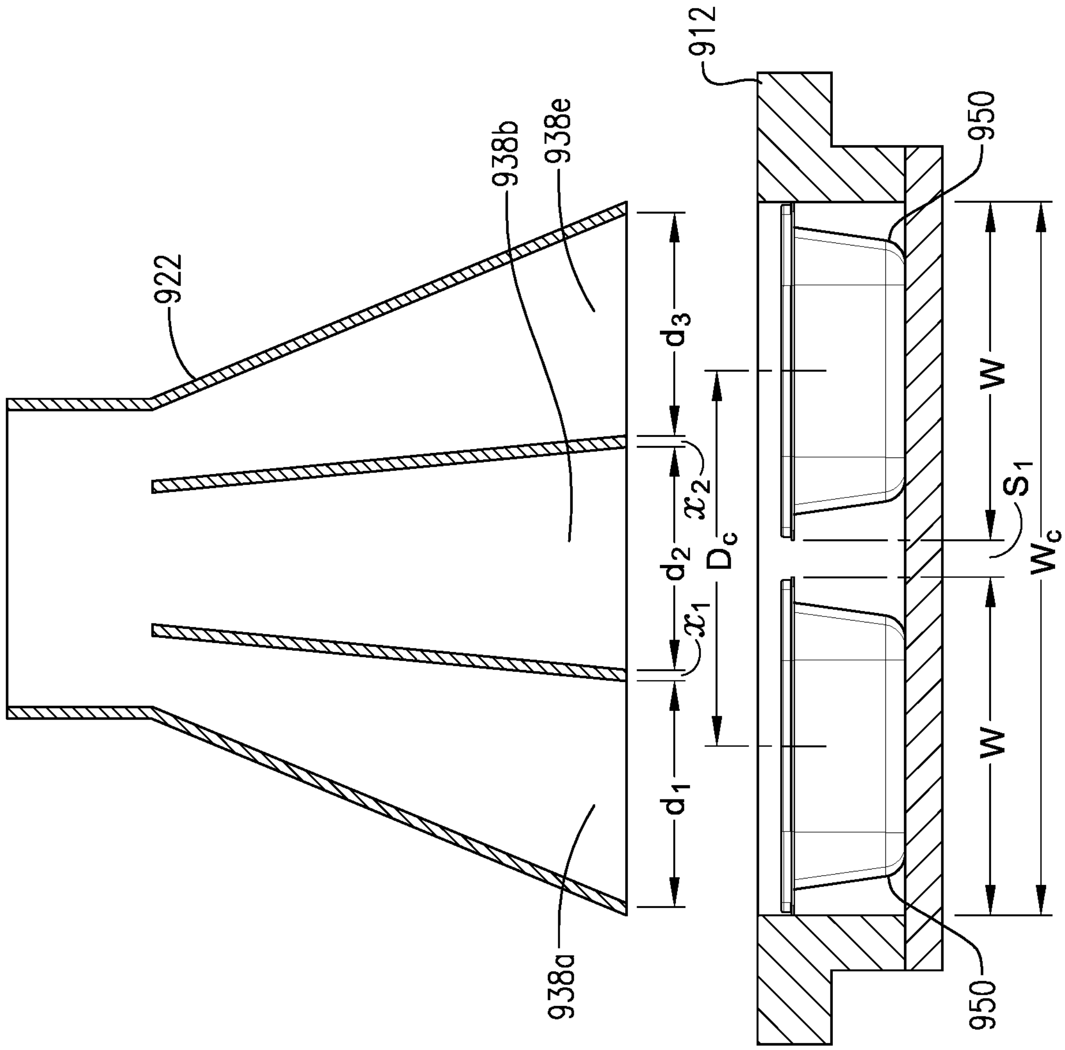
Figure 16:
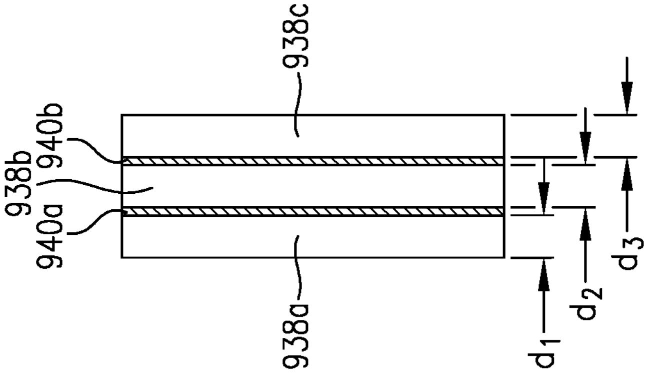
Figure 18:
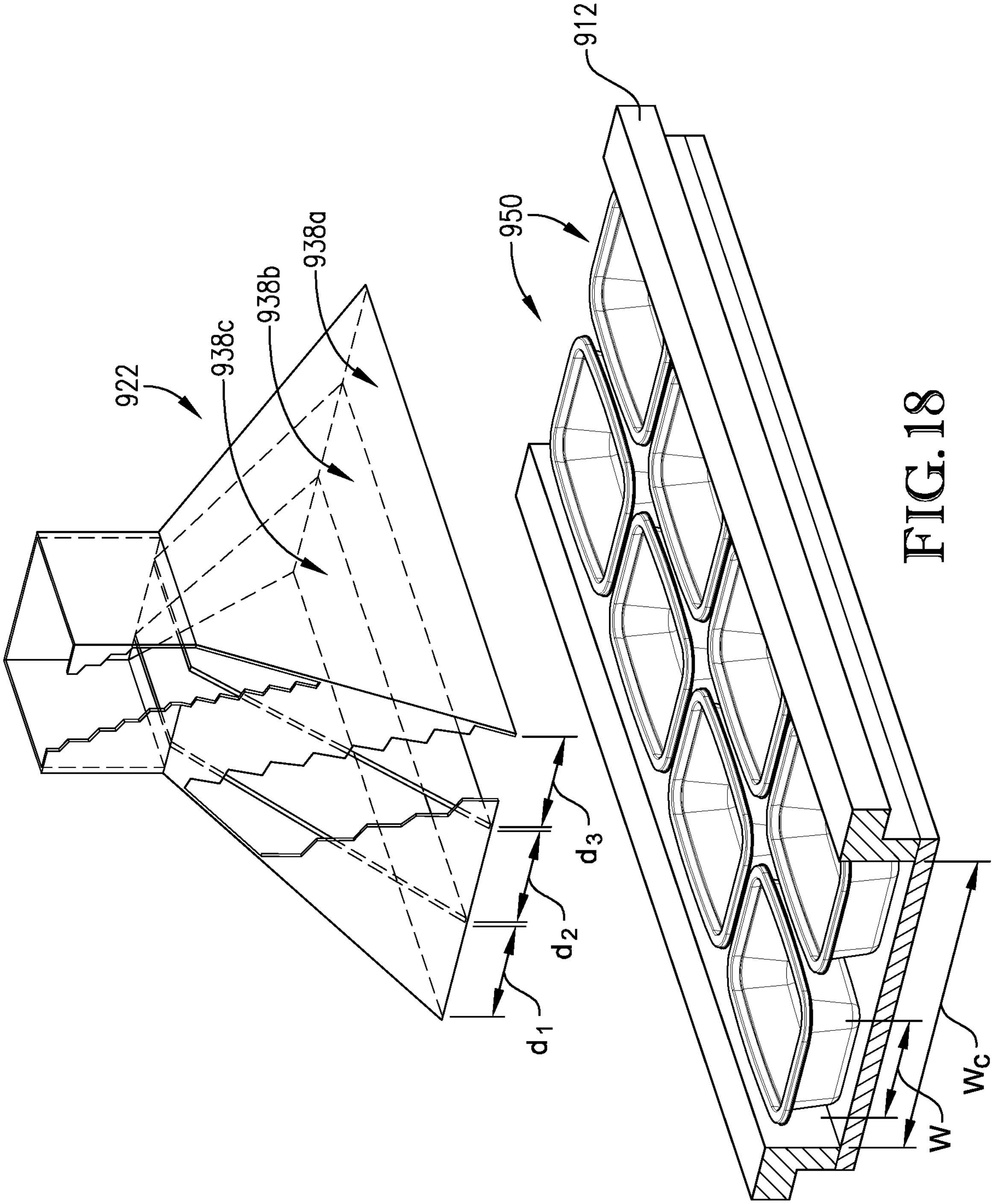
Figure 19A:
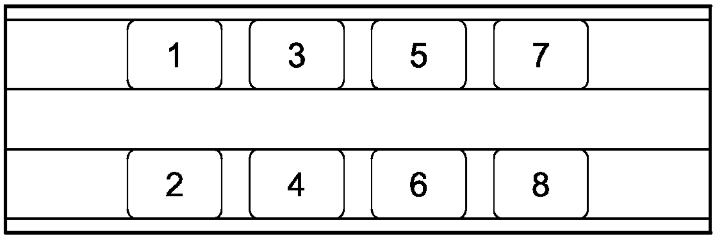
Figure 19B:
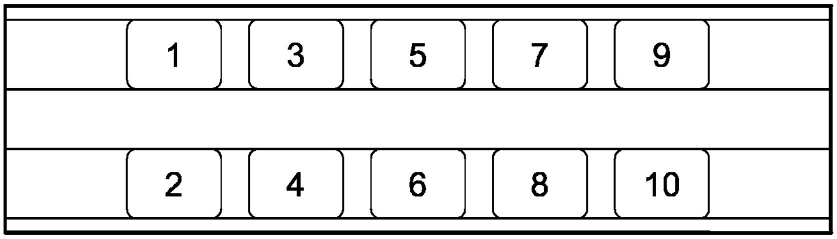
Figure 19C:
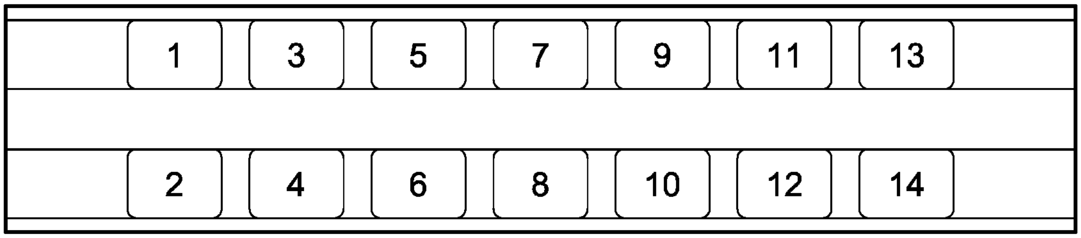

FIG. **14*c* is an end view of one embodiment of the microwave launcher generally depicted in FIGS. 14*a* and 14*b***, particularly illustrating a launcher having a flared outlet;

FIG. **14*d* is an end view of another embodiment of the microwave launcher generally depicted in FIGS. 14*a* and 14*b***, particularly illustrating a launcher having an inlet and outlet of approximately the same depth;

FIG. **14*e* is an end view of yet another embodiment of the microwave launcher generally depicted in FIGS. 14*a* and 14*b***, particularly illustrating a launcher having a tapered outlet;

FIG. 15 is an isometric view of a microwave launcher having multiple launch openings;

FIG. 16 is a bottom view of the launcher shown in FIG. 15, particularly showing the orientation of the launch openings;

FIG. 17 is a cross-sectional end view of a carrier loaded with a plurality of articles positioned near a microwave launcher configured according to one or more embodiments of the present invention, particularly illustrating several relative dimensions of the carrier, the articles, and the launcher;

FIG. 18 is a partial isometric view of a microwave launcher positioned near a carrier loaded with a plurality of articles configured according to embodiments of the present invention, and particularly illustrating some relative dimensions of the carrier, the articles, and the launch openings;

FIG. **19*a*** is a schematic diagram illustrating the location of several packaged food items heated in a microwave heating system in one of the heating trials described in the Example;

FIG. **19*b* is a schematic diagram illustrating the location of several packaged food items heated in a microwave heating system in one of the heating trials described in the Example; and FIG. 19*c*** is a schematic diagram illustrating the location of several packaged food items heated in a microwave heating system in one of the heating trials described in the Example.

DETAILED DESCRIPTION

The present invention relates to methods and systems for the microwave-assisted pasteurization and sterilization of different types of articles. As used herein, the term "article" refers to the item being pasteurized or sterilized and the package in which it is enclosed. Although generally referred to herein as an "article," it should be understood that some of the properties or characteristics of the article described herein refer to the package itself (e.g., dimensions, shapes, materials of construction, etc.), while other properties or characteristics of the article described herein refer to the item within the package being pasteurized or sterilized (e.g., temperatures, microbial lethality rates, etc.) Examples of articles suitable for heating according to embodiments of the present invention include packaged foodstuffs, beverages, medical and pharmaceutical fluids, and medical and dental instruments. In some aspects, the present invention relates to particular article packaging and carrier orientations that synergistically enhance the article heating. Unexpectedly, it has been found that articles utilizing packages having a larger width may result in more uniform heating of the package contents in a microwave heating system.

The microwave heating system used for pasteurization or sterilization may include any suitable liquid-filled, continuous microwave heating system including, for example, those similar to the microwave heating systems described in U.S. Patent Application Publication No. US2013/0240516, which is incorporated herein by reference in its entirety. Additionally, although described herein generally with reference to a foodstuff, it should be understood that embodiments of the present invention also relate to the pasteurization or sterilization of other types of items such as medical and dental instruments or medical and pharmaceutical fluids.

It has been unexpectedly found that packages having certain dimensions relative to the carrier and/or to certain components of the microwave heating system may be heated more uniformly than packages of other shapes and/or sizes. For example, it has been found that heating articles as described herein results in fewer hotspots and a more uniform degree of sterilization and/or pasteurization. Articles processed according to the present invention achieve the desired level of treatment in the same, or less, time. Consequently, the items being heated are not overheated or overcooked during processing, which results in a higher-quality end product with more desirable organoleptic properties, such as taste, texture, and color, and/or retained functionality.

In general, pasteurization involves the rapid heating of a material to a minimum temperature between 80° C. and 100° C., while sterilization involves heating the material to a minimum temperature between about 100° C. and about 140° C. Systems and processes described herein may apply to pasteurization, sterilization, or both pasteurization and sterilization. In some cases, pasteurization and sterilization may take place simultaneously, or nearly simultaneously, so that the articles being processed are both pasteurized and sterilized by the heating system. In some cases, pasteurization may be performed at lower temperatures and/or pressures and without a separate thermal equilibration period after the microwave-assisted heating, while sterilization may be performed at higher temperatures and/or pressures and can include a holding or thermal equilibration stage after the microwave-assisted heating step. In some embodiments, a single microwave system can be operationally flexible so that it is able to be selectively configured to pasteurize or sterilize various articles during different heating runs.

Articles heated in a microwave heating system as described herein may initially be secured in a carrier configured to transport the articles through the system. Several views of an exemplary carrier are provided in FIGS. 1 through 6. As generally shown below, the carrier 10 includes an outer frame 12, an upper support structure 14, and a lower support structure 16. The outer frame 12 comprises two spaced-apart side members 18*a,b* and two spaced-apart end members 20*a,b*. The first and second end members 20*a,b* may be coupled to and extend between opposite ends of first and second side members 18*a,b* to form outer frame 12. When side members 18*a,b* are longer than the end members 20*a,b*, the frame may have a generally rectangular shape, as particularly shown in FIGS. 1 and 2.

Figure 1:
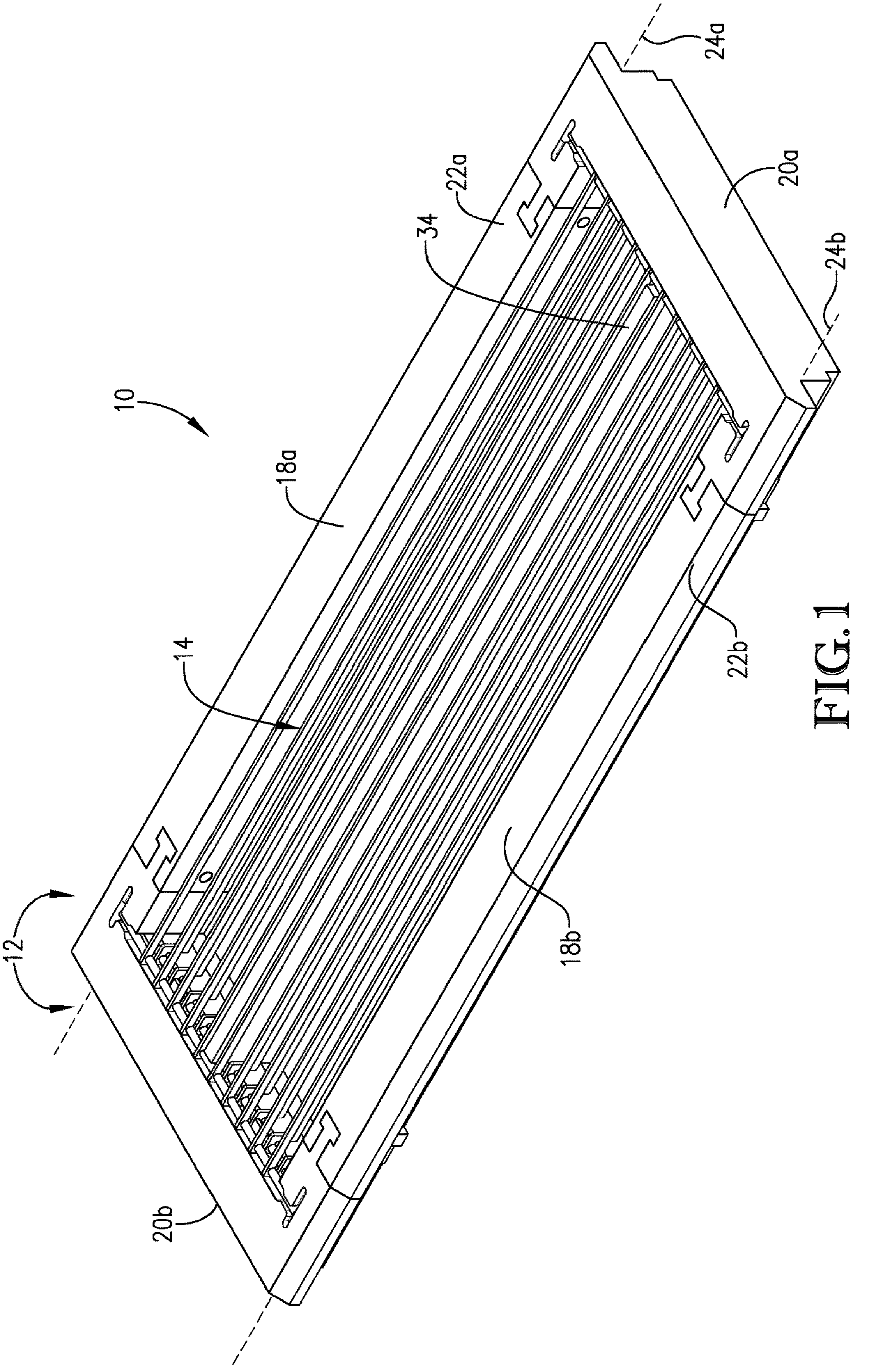
FIG. 1 is a top isometric view of a carrier suitable for use in one or more embodiments of the present invention.
Figure 2:
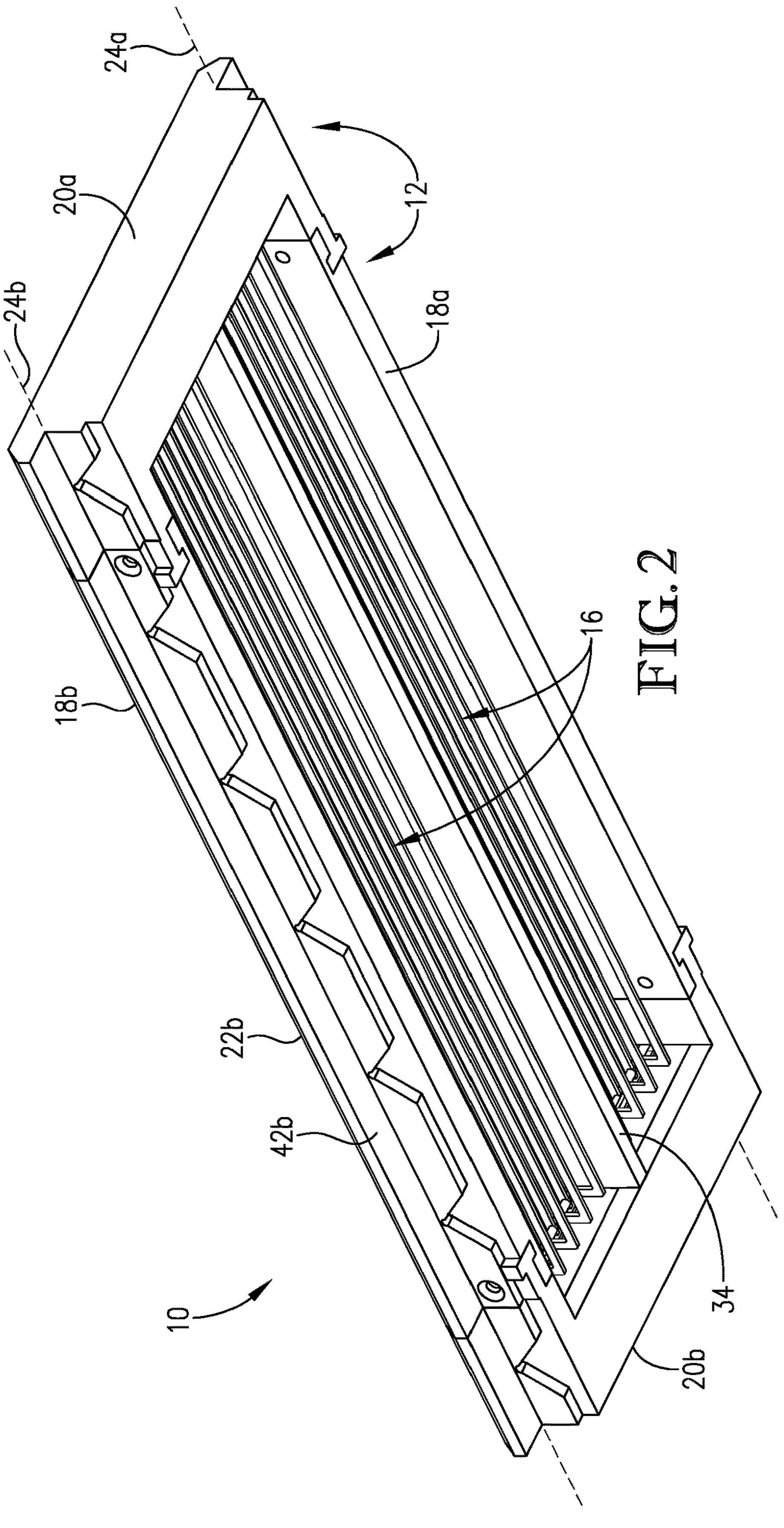
FIG. 2 is a bottom isometric view of the carrier shown in FIG. 1.
Figure 3:
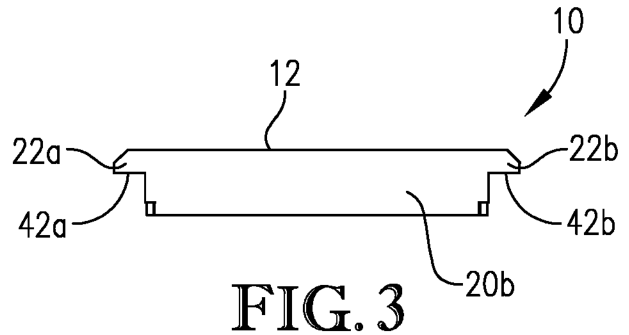
FIG. 3 is an end view of the carrier shown in FIGS. 1 and 2.
Figure 4:
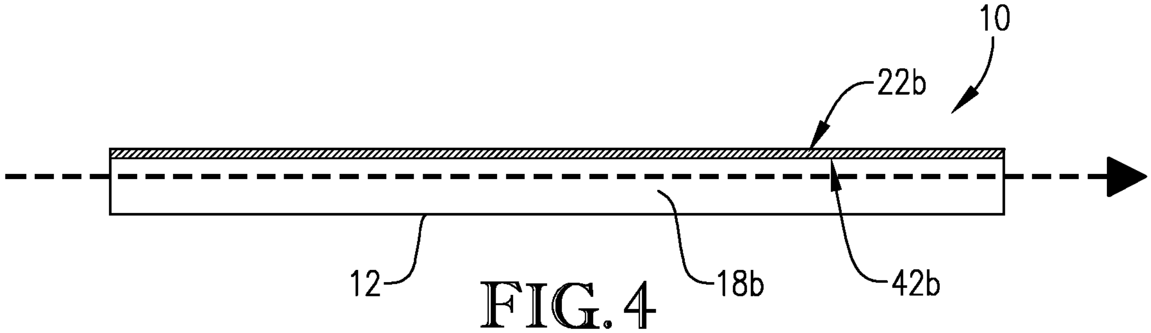
FIG. 4 is a side view of the carrier shown in FIGS. 1-3.

As shown in FIGS. 1-4, first and second side members 18*a,b* include respective support projections 22*a,b* that are configured to engage respective first and second convey line support members, which are represented by dashed lines 24*a* and 24*b* in FIGS. 1 and 2. The first and second support projections 22*a,b* of carrier 10 present first and second lower support surfaces 42*a,b* for supporting carrier 10 on first and second convey line support members 24*a,b*. Convey line support members 24*a,b* may be a moving convey line element such as, for example, a pair of chains (not shown) located on each side of carrier 10 as it moves through the microwave heating zone in a direction represented by the arrow in FIG. 4.

The first and second side members 18*a,b* and first and second end members 20*a,b* may be formed of any suitable material including, for example, a low loss material having a loss tangent of not more than about $10^{-4}$, not more than about $10^{-3}$, or not more than about $10^{-2}$, measured at 20° C. Each of the side members 18*a,b* and end members 20*a,b* may be formed of the same material, at least one may be formed of a different material. Examples of suitable low loss tangent materials may include, but are not limited to, various polymers and ceramics. In some embodiments, the low loss tangent material may be a food-grade material.

When the low loss material is a polymeric material, it may have a glass transition temperature of at least about 80° C., at least about 100° C., at least about 120° C., at least about 140° C., at least about 150° C., or at least about 160° C., in order to withstand the elevated temperatures to which the carrier may be exposed during heating of the articles. Suitable low loss polymers can include, for example, polytetrafluoroethylene (PTFE), polysulfone, polynorbornene, polycarbonate (PC), acrylonitrile butadiene styrene (ABS), poly(methyl methacrylate) (PMMA), polyetherimide (PEI), polystyrene, polyvinyl alcohol (PVA), polyvinyl chloride (PVC), and combinations thereof. The polymer can be monolithic or it may be reinforced with glass fibers, such as, for example glass-filed PTFE ("TEFLON"). Ceramics, such as aluminosilicates, may also be used as the low loss material.

As shown in FIGS. 1 and 2, the carrier 10 may include an upper support structure 14 and a lower support structure 16 for holding a group of articles within the carrier, while also permitting microwave energy pass through the carrier 10 to the articles. In the example shown in FIGS. 1 and 2, the upper and lower support structures 14, 16 may each include a plurality of support members extending between the end members 20*a,b* in a direction substantially parallel to the side members 18*a,b*. The support members may extend in a direction substantially perpendicular to the end members 20*a,b*. As used herein, the terms "substantially parallel" and "substantially perpendicular" mean within 5° of being parallel or perpendicular, respectively. In other instances (not shown), upper and lower support structures 14, 16 could include a grid member or substantially rigid sheets of a microwave transparent or semi-transparent material extending between the side members 18*a,b* and end members 20*a,b*. Additional details regarding the number, dimensions, and configurations of support structures 14 and 16 are provided in U.S. Patent Application Publication No. 2017/0099704, the entirety of which is incorporated herein by reference.

When the upper and/or lower support structures 14, 16 include individual support members, as shown in FIGS. 1 and 2, above, one or more of the support members may be formed of a strong, electrically conductive material. Suitable electrically conductive materials can have a conductivity of at least about $10^3$ Siemens per meter (S/m), at least about $10^4$ S/m, at least about $10^5$ S/m, at least about $10^6$ S/m, or at least about $10^7$ S/m at 20° C., measured according to ASTM E1004 (09). Additionally, the electrically conductive material may have a tensile strength of at least about 50 MegaPascals (MPa), at least about 100 MPa, at least about 200 MPa, at least about 400 MPa, or at least about 600 MPa, measured according to ASTM E8/E8M-16a, and/or it may also have a yield strength of at least about 50, at least about 100, at least about 200, at least about 300, or at least about 400 MPa at 20° C., measured according to ASTM E8/E8M-16a.

The Young's Modulus of the electrically conductive material can be at least about 25 GigaPascals (GPa), at least about 50 GPa, at least about 100 GPa, or at least about 150 GPa and/or not more than about 1000 GPa, not more than about 750 GPa, not more than about 500 GPa, or not more than about 250 GPa, measured at 20° C., measured according to ASTM E111-04 (2010). The electrically conductive material may be metallic and, in some cases, may be a metal alloy. The metal alloy may include any mixture of suitable metal elements including, but not limited to, iron, nickel, and/or chromium. The electrically conductive material may comprise stainless steel and may be food-grade stainless steel.

Figure 5:
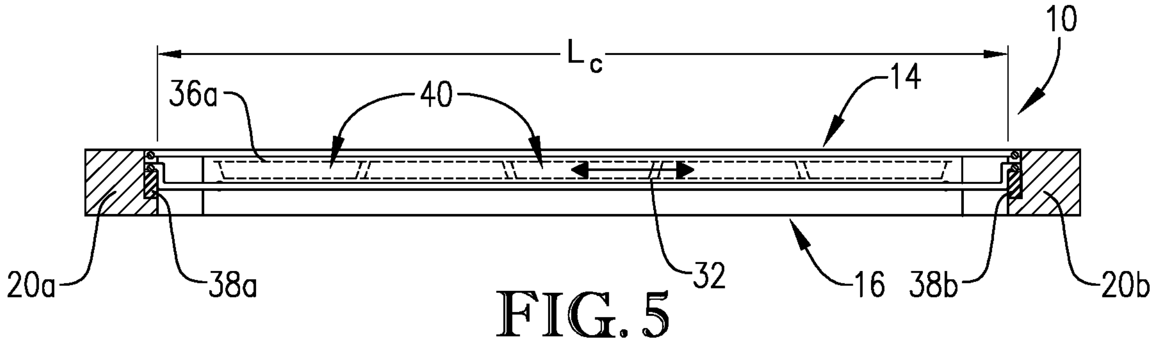
FIG. 5 is a longitudinal cross-section of the carrier shown in FIGS. 1-4.

As particularly shown in FIG. 5, carrier 10 defines a cargo volume 32 for receiving and holding a plurality of articles

40. Cargo volume 32 is at least partially defined between the upper and lower support structures 14 and 16, which are vertically spaced apart from one another, and the side 18*a,b* and end 20*a,b* members. The articles received in cargo volume 32 may be in contact with and/or held in position by at least a portion of the individual support members present in the upper and lower support structures 14 and 16. Each of upper and lower support structures 14, 16 may be coupled to outer frame 12 in a removable or hinged manner so that at least one of the upper and lower support structures 14, 16 may be opened to load the articles 40 into carrier 10, closed to hold the articles 40 during heating, and opened again to unload the articles 40 from the carrier.

Figure 6:
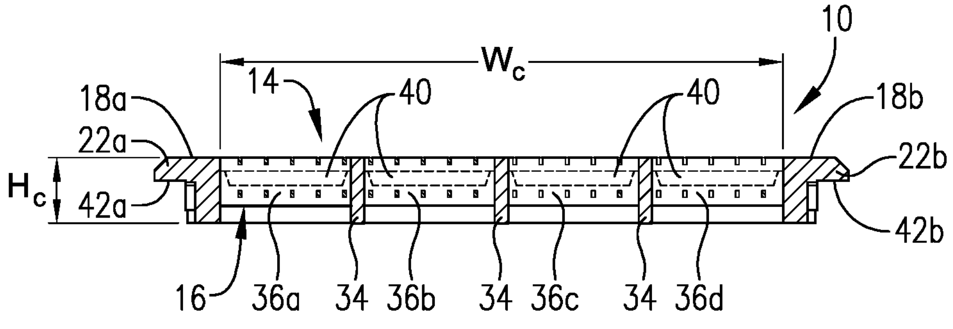
FIG. 6 is a transverse cross-section of the carrier shown in FIGS. 1-5.

Cargo volume 32 has a length ($L_c$) measured between opposing internal surfaces of the first and second end members 20*a,b*, as generally shown in FIG. 5, a width ($W_c$) measured between opposing internal surfaces of the first and second side members 18*a,b*, as generally shown in FIG. 6, and a height ($H_c$) measured between opposing internal surfaces of the upper and lower support structures 14, 16, as also generally shown in FIG. 6. The length of the cargo volume 32 can be in the range of from about 0.5 to about 10 feet, about 1 to about 8 feet, or about 2 to about 6 feet, and the width of the cargo volume can be in the range of from about 0.5 to about 10 feet, about 1 to about 8 feet, or from about 2 to about 6 feet. The height of the cargo volume 32 may be in the range of from about 0.50 to about 8 inches, from about 0.75 to about 6 inches, from about 1 to about 4 inches, or from about 1.25 to about 2 inches. Overall, the cargo volume 32 can have a total volume in the range of from about 2 to about 30 cubic feet, about 4 to about 20 cubic feet, about 6 to about 15 cubic feet, or about 6.5 to about 10 cubic feet.

Additionally, the carrier may further include at least one article spacing member for adjusting the size and/or shape of the cargo volume 32. Examples of article spacing members include dividers, shown in FIGS. 1 and 2 as divider 34, for dividing the cargo volume 32 into two or more compartments and vertical spacers, shown in FIG. 5 as spacers 38*a,b*, for adjusting the vertical height between the upper and lower support structures 14, 16. When present, the article spacing member, or members, may be permanently or removably coupled to the outer frame 12 or at least one of the upper and lower support structures 14, 16. When an article spacing member is removably coupled to the outer frame 12 and/or to the upper and lower support members 14, 16, it may be selectively inserted into and removed from the carrier 10 in order to change the size and/or shape of the cargo volume 32 so that the carrier 10 may hold many types of articles having different sizes and/or shapes. When the article spacing member or members are permanently, or fixedly, coupled to the outer frame 12 and/or upper and lower support members 14, 16, the carrier 10 may be configured to carry a few, or only one, type of articles. Both types of carriers may be used according to the present invention.

When the carrier 10 includes one or more dividers 34 for dividing the cargo volume 32 into multiple compartments, as particularly shown in FIGS. 1, 2, and 6, the compartments may extend in a direction substantially parallel to the first and second side members 18*a,b*. As a result, each compartment may be spaced apart from an adjacent compartment along the width of the carrier 10. Therefore, each compartment, examples of which are shown as compartments 36*a-d* in FIGS. 5 and 6, defined within the cargo volume 32 of carrier 10 may have a length and height similar to that of cargo volume 32 as described above, but may have a width that is in the range of from 5 to 95 percent, 10 to 90 percent, 20 to 80 percent, 25 to 75 percent, or 40 to 60 percent of the entire width of the cargo volume 32, or it can be at least about 5, at least about 10, at least about 15, at least about 20, or at least about 25 percent and/or not more than about 95, not more than about 90, not more than about 85, not more than about 80, not more than about 75, not more than about 70, not more than about 60, not more than about 55, not more than about 50, not more than about 40, not more than about 35, not more than about 30, or not more than about 25 percent of the entire width of the cargo volume 32. The width of each individual compartment can be in the range of from 2 to 24 inches, 4 to 18 inches, or 5 to 10 inches.

According to the present invention, a group of articles may be loaded into the cargo volume of the carrier and held therein while the carrier transports the articles through the microwave heating system. The articles processed may include packages of any suitable size and/or shape and may contain any food or beverage, any medical, dental, pharmaceutical or veterinary fluid, or any instrument capable of being processed in a microwave heating system. Examples of suitable foodstuffs can include, but are not limited to, fruits, vegetables, meats, pastas, pre-made meals, soups, stews, jams, and even beverages. Additionally, the material used to form the package itself is not limited, but at least a portion of it must be at least partially microwave transparent in order to facilitate heating of the contents using microwave energy.

Articles held in carriers and processed by microwave heating systems as described herein may have any suitable size and shape. For example, each article, or more specifically its package, can have a length of at least about 1, at least about 2, at least about 4, or at least about 6 inches and/or not more than about 18, not more than about 12, not more than about 10, not more than about 8, or not more than about 6 inches. The length of each article may be in the range of from about 1 to about 18 inches, about 2 to about 12 inches, about 4 to about 10 inches, or about 6 to about 8 inches. The width of each article may be at least about 1 inch, at least about 2 inches, at least about 4 inches, at least about 4.5 inches, or at least 5 inches and/or not more than about 12 inches, not more than about 10 inches, not more than about 8 inches, or not more than 6 inches. The width of each article may be in the range of from about 1 inch to about 12 inches, about 2 inches to about 10 inches, about 4 inches to about 8 inches, about 4.5 inches to about 6 inches, or about 5 inches to about 6 inches. Each article may have a depth of at least about 0.5 inches, at least about 1 inch, at least about 1.5 inches and/or not more than about 8 inches, not more than about 6 inches, or not more than about 3 inches, or a depth in the range of from about 0.5 to about 8 inches, about 2 to about 6 inches, or 1.5 to 3 inches. In some embodiments, the article can be square, such that its length and width are approximately the same. The article can have a total interior volume of at least about 10.6, at least about 10.75, at least about 10.9, at least about 11, at least about 12 or at least about 15 ounces, and/or not more than about 30, not more than about 25, or not more than about 20 ounces.

As used herein, the terms "length" and "width" refer to the longest and second longest, respectively, non-diagonal dimensions of an article. When the article has a generally trapezoidal shape such that the top of the article is longer and wider than its bottom, the length and width of the article are measured at the largest cross-section (usually the top surface). The height of the article is the shortest non-diagonal dimension measured perpendicular to the plane defined by the length and width. The articles may be individually packaged items having a generally square, rectangular, or elliptical cross-sectional shape and may be formed of any suitable material including, but not limited to, various types of plastic, cellulosic materials, and other microwave-transparent materials. Various views of an exemplary trapezoidal-shaped article 250 having a rectangular cross-section are depicted in FIGS. 7*a-d*, below, with the length (L), width (W), and height (h) of the article being shown therein.

It has been found that the ratio of the length of an article to its width may have an impact on how uniformly its contents are heated when processed in a microwave heating system as described herein. Although not wishing to be bound by theory, it is hypothesized that utilizing articles having a slightly larger width than conventionally-sized articles may result in better heating of the article contents, including more uniform microbial lethality and fewer hot and cold spots. According to the invention, articles with a length to width ratio (L:W) of at least 1.01:1, or 1:1, and not more than 1.39:1 provide unexpected results. The L:W of articles used as described herein can be at least 1.05:1, at least 1.1:1, or at least 1.15:1 and/or not more than about 1.38:1, not more than about 1.37:1, not more than about 1.36:1, not more than about 1.35:1, not more than about 1.34:1, not more than about 1.33:1, not more than about 1.32:1, not more than about 1.31:1, not more than about 1.30:1, not more than about 1.29:1, not more than about 1.28:1, not more than about 1.27:1, not more than about 1.26:1, not more than about 1.25:1, not more than about 1.24:1, not more than about 1.23:1, not more than about 1.22:1, not more than about 1.21:1, not more than about 1.20:1, not more than about 1.19:1, not more than about 1.18:1, not more than about 1.17:1, not more than about 1.16:1, not more than about 1.15:1, not more than about 1.14:1, not more than about 1.13:1, not more than about 1.12:1, not more than about 1.11:1, not more than about 1.10:1, not more than about 1.09:1, not more than about 1.08:1, not more than about 1.07:1, not more than about 1.06:1, not more than about 1.05:1, not more than about 1.04:1, or not more than about 1.03:1.

The dimensions of the article may also be described relative to the size of the wavelength of the predominant mode of microwave energy introduced into the microwave chamber where the articles are heated, as measured in the fluid medium within the microwave chamber. The wavelength of the predominant mode of microwave energy introduced into the heating chamber is represented by lambda, λ. In some cases, the wavelength of the predominant mode of microwave energy can be at least about 1.45, at least about 1.50, at least about 1.55, at least about 1.60 inches and/or not more than about 1.80, not more than about 1.75, or not more than about 1.70 inches. The articles can have a width that is at least at least 2.70 λ, at least about 2.75 λ, at least about 2.80 λ, at least about 2.85 λ, at least about 2.90 λ, at least about 2.95 λ, at least about 3.0 λ and/or not more than about 3.5 λ, not more than about 3.25 λ, not more than about 3.2 λ, not more than about 3.15 λ, or not more than about 3.10 λ. It should also be understood that the predominant wavelength A is determined at the conditions of operation of the microwave heating chamber.

When loaded into a carrier as described herein, the articles may be placed within the cargo volume defined between the upper and lower support structures of the carrier. The cargo volume may comprise a single compartment, or it may be divided into two or more smaller compartments using one or more dividers, as discussed previously. Overall, the cargo volume can be configured to hold at least 6, at least 8, at least 10, at least 16, at least 20, at least 24, at least 30, or at least 36 articles and/or not more than 100, not more than 80, not more than 60, not more than 50, not more than 40, or not more than 30 articles in total. Articles may be loaded into the carrier manually and/or with any suitable type of automated device.

As discussed previously, it has been discovered that utilizing wider articles provides unexpected benefits in terms of more uniform heating and a more consistent microbial lethality. It has also been discovered that employing carrier with a wider cargo volume may further enhance these benefits. For example, in some cases, enhanced results have been observed when the ratio of the width of at least one of the articles to the total width of the cargo volume into which the articles are placed is at least about 0.46:1, at least about 0.47:1, at least about 0.48:1, at least about 0.49:1, or at least about 0.50:1 and/or not more than about 0.55:1, not more than about 0.53:1, or not more than about 0.52:1. When the carrier includes one or more dividers to separate the cargo volume into two or more individual compartments, similar results have been observed when the ratio of the width of at least one of the articles to the width of at least one of the individual lanes is at least about 0.67:1, at least about 0.68:1, at least about 0.69:1, at least about 0.70:1, at least about 0.71:1, at least about 0.72:1, at least about 0.73:1, at least about 0.74:1, or at least about 0.75:1. In some cases, this ratio may be not more than about 0.85:1, not more than about 0.82:1, not more than about 0.80:1, not more than about 0.77:1, or not more than about 0.76:1.

Turning now to FIG. 8, a top view of one example of a carrier 10 loaded with a plurality of articles 40 is provided. The articles 40 shown in FIG. 8 are arranged in single rows that extend along the length of the carrier. The articles may be arranged in at least 2, at least 3, at least 4, at least 5, at least 6, or at least 7 single rows and/or not more than 15, not more than 12, not more than 10, or not more than 8 single rows. When the articles in carrier 10 are arranged in two or more rows, the articles in adjacent rows can be spaced apart from one another along the width of the carrier in a side-by-side configuration. In some embodiments, the rows of articles may be spaced apart from one another via one or more dividers 34, while, in other embodiments, no divider may be used. In some cases, it may be desirable to minimize the spacing between articles in a single row such that the average distance between consecutive edges of articles loaded into the carrier can be not more than about 1 inch, not more than about 0.75 inches, not more than about 0.5 inches, not more than about 0.25 inches, or not more than about 0.1 inch. In some cases, there may be no gaps between consecutive articles in a single row so that the articles are in contact with one another when loaded into the carrier. In some cases, at least a portion of consecutive articles in a single row may overlap horizontally.

The specific arrangement of articles in the carrier may depend, at least in part, on the shape of the articles. When the articles have a general trapezoidal-like shape, such as the one described above with respect to FIGS. 7*a* through 7*d*, the articles may be arranged in a nested configuration, which is generally illustrated in FIGS. 8 and 9.

In a nested configuration, adjacent articles in a single row, shown as 40*a-f* in FIG. 9, have opposite orientations. In the nested configuration, a row of articles 40*a-f* loaded into the carrier is sequentially oriented in the direction of travel 50 in a top down, top up, top down, top up configuration. As shown in FIG. 8, the tops of the articles in carrier 10 are marked with a "T", and the bottoms of the articles in carrier 10 are marked with a "B", and the direction of travel is shown by arrow 50. In the example shown in FIG. 8, a plurality of dividers 34, as discussed previously, are used to separate the individual rows of nested articles within the carrier 10. As particularly shown in FIG. 9, when arranged in a nested configuration, the bottom of the second article 40*b* is oriented between the top of the first article 40*a* and the top of the third article 40*c*. Additionally, in a nested configuration, the tops of one set of alternating articles 40*a*, 40*c*, and 40*e* and the bottoms of the other set of alternating articles 40*b*, 40*d*, and 40*f* contact the upper support structure (not shown in FIGS. 8 and 9), while the bottoms of one set of alternating articles 40*a*, 40*c*, and 40*e* and the tops of the other set of alternating articles 40*b*, 40*d*, and 40*f* contact the lower support structure (now shown in FIGS. 8 and 9) when the articles are loaded into carrier 10. It has been discovered that arranging the articles in a nested configuration can provide for more uniform heating. In some cases, the articles arranged in a nested configuration can be rigid articles such as trays, containers, and the like.

Another view of articles arranged in a nested configuration is shown in FIG. 10, below. As shown in FIG. 10, the articles 40 are lined up in a single row in one compartment 36*a* of the cargo volume that is defined between upper and lower support structures 14, 16 and between divider 34 and side member 18*a*. FIG. 10 also illustrates one example of upper and lower support structures 14, 16 that respectively include upper and lower groups of support members, shown as 26*a* and 26*b*. As shown in the example depicted in FIG. 10, the individual support members in upper and lower groups of support members 26*a,b* include slats having a generally rectangular cross sectional shape arranged so that the height of each slat is greater than its width. Such a configuration may provide superior strength and enhancement of microwave field uniformity, particularly when at least a portion of the slats are formed from an electrically conductive material.

Figure 11A:
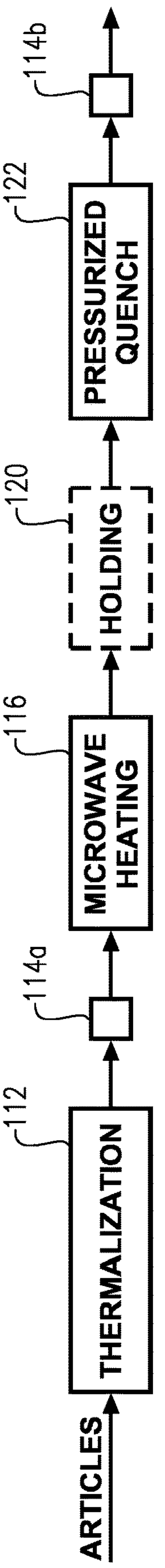
Figure 11B:
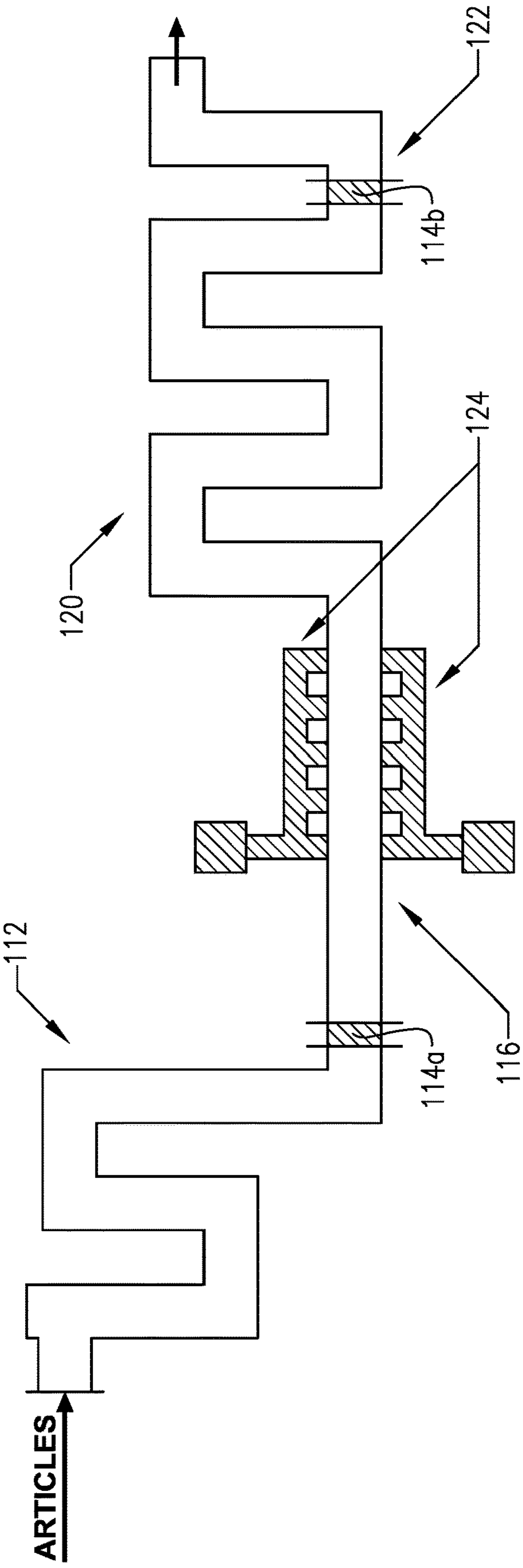

Turning now to FIGS. 11*a* and 11*b*, schematic diagrams of the main steps of a microwave heating process and the main elements of a microwave heating system suitable for use according to embodiments of the present invention are provided.

As shown in FIGS. 11*a* and 11*b*, the articles, which are loaded into one or more carriers (not shown), can initially be introduced into a thermalization zone 112, wherein the articles can be thermalized to a substantially uniform temperature. Once thermalized, the articles can optionally be passed through a pressure adjustment zone 114*a* before being introduced into a microwave heating zone 116. In microwave heating zone 116, the articles can be rapidly heated using microwave energy discharged into at least a portion of the microwave heating zone 116 by one or more microwave launchers 124, as generally shown in FIG. 11*b*. The heated articles can then optionally be passed through a holding zone 120, wherein the coldest portion of each article can be maintained at a temperature at or above a predetermined target temperature for a specified amount of time. Subsequently, the articles can then be passed from the microwave heating zone 116 (when no holding zone is present) or from the holding zone 120, when present, to a quench zone 122, wherein the temperature of the articles can be quickly reduced to a suitable handling temperature. After a portion (or all) of the cooling step, the cooled articles can optionally be passed through a second pressure adjustment zone 114*b* before being removed from the system. In some cases, the system may further cool the articles after the initial high-pressure cooling step in an atmospheric cooling chamber (not shown).

The above-described thermalization 112, microwave heating 116, holding 120, and/or quench zones 122 of the microwave system depicted in FIGS. 11*a* and 11*b* can be defined within a single vessel, or at least one of the above-described stages or zones can be defined within one or more separate vessels. Additionally, in some cases, at least one of the above-described steps can be carried out in a vessel that is at least partially filled with a liquid medium in which the articles being processed can be at least partially submerged. As used herein, the term "at least partially filled" denotes a configuration where at least 50 percent of the volume of the specified vessel is filled with a liquid medium. In certain embodiments, the volume of at least one of the vessels used in the thermalization zone, the microwave heating zone, the holding zone, and the quench zone can be at least about 75 percent, at least about 90 percent, at least about 95 percent, or 100 percent filled with a liquid medium.

The liquid medium used may be any suitable liquid medium. For example, the liquid medium may have a dielectric constant greater than the dielectric constant of air and, in one embodiment, can have a dielectric constant similar to the dielectric constant of the articles being processed. Water (or a liquid medium comprising water) may be particularly suitable for systems used to heat consumable articles. The liquid medium may also include one or more additives, such as, for example, oils, alcohols, glycols, and salts in order to alter or enhance its physical properties (e.g., boiling point) at the conditions of operation.

The microwave heating systems as described herein may include at least one conveyance system (not shown in FIGS. 11*a* and 11*b*) for transporting the articles through one or more of the processing zones described above. Examples of suitable conveyance systems can include, but are not limited to, plastic or rubber belt conveyors, chain conveyors, roller conveyors, flexible or multi-flexing conveyors, wire mesh conveyors, bucket conveyors, pneumatic conveyors, screw conveyors, trough or vibrating conveyors, and combinations thereof. Any suitable number of individual convey lines can be used with the conveyance system, and the convey line or lines may be arranged in any suitable manner within the vessels.

In operation, the loaded carriers introduced into the microwave system depicted in FIGS. 11*a* and 11*b* are initially introduced into a thermalization zone 112, wherein the articles are thermalized to achieve a substantially uniform temperature. For example, at least about 85 percent, at least about 90 percent, at least about 95 percent, at least about 97 percent, or at least about 99 percent of all the articles withdrawn from the thermalization zone 112 can have a temperature within about 5° C., within about 2° C., or within 1° C. of one another. As used herein, the terms "thermalize" and "thermalization" generally refer to a step of temperature equilibration or equalization.

In some embodiments, the heat transfer coefficient within the thermalization chamber can be increased, at least in part, by agitating the gaseous or liquid medium within the chamber using one or more agitation devices, such as, for example, one or more fluid jet agitators configured to turbulently discharge one or more fluid jets into the interior of the thermalization chamber. The fluid jets discharged into the thermalization chamber can be liquid or vapor jets and can have a Reynolds number of at least about 4500, at least about 8000, or at least about 10,000.

Turning now to FIGS. 12*a* and 12*b*, several views of one example of a thermalization chamber 212 including a plurality of fluid jet agitators 218 configured according to embodiments of the present invention are schematically shown. Structurally, fluid jet agitators 218 used in the thermalization chamber 212 can be any device configured to discharge a plurality of pressurized fluid jets toward the articles passing therethrough at one or multiple locations within thermalization chamber 212. In one embodiment shown in FIG. 12*a*, the fluid jet agitators 218 can be axially spaced from one another along the central axis of elongation of the thermalization chamber 212 (or the direction along which the articles are conveyed by a conveyor 240 shown by arrow 250) such that at least a portion of the pressurized jets are configured to discharge in a direction generally perpendicular to central axis of elongation (or direction of convey 250) of the articles. Such jets can be located on opposite sides of the thermalization chamber 212 and/or may also be circumferentially positioned within the thermalization chamber 212 such that at least a portion of the jets are directed radially inwardly toward the central axis of elongation (or convey direction 250) as generally shown in FIG. 12*b*. Similar configurations of fluidized jets may be employed in the microwave heating chamber and/or quench chamber, in addition to, or alternatively, to such jets in the thermalization chamber.

Turning again to FIGS. 11*a* and 11*b*, when the thermalization zone 112 is at least partially filled with a liquid medium, the articles in the carrier passing through the thermalization zone 112 can be at least partially submerged in the liquid during the passing. The liquid medium in the thermalization zone 112 can be warmer or cooler than the temperature of the articles passing therethrough and, in some cases, can have an average bulk temperature of at least about 30° C., at least about 35° C., at least about 40° C., at least about 45° C., at least about 50° C., at least about 55° C., or at least about 60° C. and/or not more than about 100° C., not more than about 95° C., not more than about 90° C., not more than about 85° C., not more than about 80° C., not more than about 75° C., not more than about 70° C., not more than about 65° C., or not more than about 60° C.

The thermalization step can be carried out under ambient pressure or it may be carried out in a pressurized vessel. When pressurized, thermalization may be performed at a pressure of at least about 1, at least about 2, at least about 5, or at least about 10 psig and/or not more than about 80, not more than about 50, not more than about 40, or not more than about 25 psig. When the thermalization zone 112 is liquid filled and pressurized, the pressure may be in addition to any head pressure exerted by the liquid. Articles undergoing thermalization can have an average residence time in the thermalization zone 112 of at least about 30 seconds, at least about 1 minute, at least about 2 minutes, at least about 4 minutes and/or not more than about 20 minutes, not more than about 15 minutes, or not more than about 10 minutes. The articles withdrawn from the thermalization zone 112 can have an average temperature of at least about 20° C., at least about 25° C., at least about 30° C., at least about 35° C. and/or not more than about 70° C., not more than about 65° C., not more than about 60° C., or not more than about 55° C.

In some embodiments, the thermalization zone 112 and microwave heating zone 116 may operate at substantially different pressures, and the carrier withdrawn from the thermalization zone 112 may be passed through a pressure adjustment zone 114*a* before entering the microwave heating zone 116. When used, the pressure adjustment zone 114*a* may be any zone or system configured to transition the carrier between an area of lower pressure and an area of higher pressure. The difference between the low and high pressure zones may vary depending on the system and can, for example, be at least about 1 psig, at least about 5 psig, at least about 10 psig, at least about 12 psig and/or not more than about 50 psig, not more than about 45 psig, not more than about 40 psig, or not more than about 35 psig.

When the quench zone 122 shown in FIGS. 11*a* and 11*b* is operated at a different pressure than the microwave heating zone 116, another pressure adjustment zone 114*b* may also be present to transition the carrier between the higher-pressure microwave heating zone 116 or hold zone 120 and the lower-pressure quench zone 122. In some cases, the first pressure adjustment zone 114*a* can transition the carrier from a lower pressure thermalization zone 112 to a higher pressure microwave heating zone 116, while the second pressure adjustment zone 114*a* may transition the carrier from a higher pressure holding zone 120 (or portion of the quench zone 122) to a lower pressure quench zone 122 (or portion thereof).

As generally shown in FIGS. 11*a* and 11*b*, after thermalization, the loaded carrier may be introduced into the microwave heating zone 116, wherein the articles may be heated using at least a portion of the microwave energy discharged into a microwave heating chamber via one or more microwave launchers 124. As used herein, the term "microwave energy" refers to electromagnetic energy having a frequency between 300 MHz and 30 GHz. Various configurations of microwave heating systems of the present invention may employ microwave energy having a frequency of about 915 MHz or about 2450 MHz, with the former being preferred. In addition to microwave energy, the microwave heating zone 116 my optionally utilize one or more other types of heat sources such as, for example, various conductive or convective heating methods of devices. However, it is generally preferred that at least about 50, at least about 55, at least about 60, at least about 65, at least about 70, at least about 75, at least about 80, at least about 85, at least about 90, or at least about 95 percent of the energy used to heat the articles can be microwave energy from a microwave source.

One example of a microwave heating zone 316 suitable for use in the inventive system is schematically illustrated in FIG. 13. The microwave heating zone shown in FIG. 13 generally includes a microwave heating chamber 330, at least one microwave generator 332 for generating microwave energy, and a microwave distribution system 334 for directing at least a portion of the microwave energy from the generator or generators 332 to the microwave heating chamber 330. The system further comprises one or more microwave launchers, shown as top and bottom groups of launchers 324*a* and 324*b* in FIG. 13, for discharging microwave energy into the interior of the microwave heating chamber. The microwave heating zone may also include a convey system 340 having a convey line support for transport a plurality of carriers 312 loaded with groups of articles through the microwave heating zone 316.

Each microwave launcher in a microwave heating zone may be configured to emit a particular amount of microwave energy into the microwave heating chamber. For example, each microwave launcher may be configured to emit at least about 5, at least about 7, at least about 10, at least about 15 kW and/or not more than about 50, not more than about 40, not more than about 30, not more than about 25, not more than about 20, or not more than about 17 kW. When the system includes two or more microwave launchers, each launcher may emit the same amount of energy as one or more other launchers, or at least one launcher may emit a different (e.g., lower or higher) amount of energy, as compared to at least one of the other launchers. Overall, the total amount of energy discharged into the microwave heating chamber can be at least about 25 kW, at least about 30 kW, at least about 35 kW, at least about 40 kW, at least about 45 kW, at least about 50 kW, at least about 55 kW, at least about 60 kW, at least about 65 kW, at least about 70 kW, or at least about 75 kW and/or not more than about 100 kW, not more than about 95 kW, not more than about 90 kW, not more than about 85 kW, not more than about 80 kW, not more than about 75 kW, not more than about 70 kW, or not more than about 65 kW.

When the microwave heating zone includes two or more microwave launchers, at least some of the launchers may be positioned on the same side of the microwave heating chamber, such as, for example, launchers 324*a* shown in FIG. 13. These same-side launchers may be axially spaced from one another along the length of the microwave heating chamber, in a direction parallel to the direction of travel of the carrier (or the convey direction) passing through the microwave heating chamber 330. The microwave heating zone 316 may also include two or more same-side launchers that are laterally spaced from one another in a direction generally perpendicular to the direction of travel of the carriers through the chamber.

As the carrier moves along the convey line 340 through the microwave heating chamber 330, it passes by each same-side launcher 324. As the carrier passes near a launcher 324, at least a portion of the microwave energy emitted from the launcher 324 is directed toward the articles. Once the carrier has moved past one of the same-side launchers 324, there may be a "rest" or dwell time in which little, or no, microwave energy is directed toward the articles. In some cases, the dwell time between launchers 324 in the microwave heating zone 316 can be at least about 0.5 seconds, at least about 0.75 seconds, at least about 1 second, at least about 2 seconds, or at least about 3 seconds and/or not more than about 10 seconds, not more than about 8 seconds, not more than about 6 seconds, not more than about 4 seconds, or not more than about 2 seconds. During the dwell time, little (e.g., less than 5 kW) or no microwave energy may be discharged from one or more of the launchers, while the carrier remains stationary or moves through at least a portion of the microwave chamber 330. In some embodiments, the total dwell time experienced by the articles in a single carrier can be at least about 3, at least about 5, at least about 6, at least about 10, at least about 15, or at least about 20 seconds and/or not more than about 5 minutes, not more than about 2 minutes, not more than about 1 minute, or not more than about 30 seconds.

In some cases, the convey line 340 may be configured so that the carrier moves back and forth through the microwave heating chamber 330. In some embodiments, the total number of times a single carrier passes by a given microwave launcher 324 (or passes through a microwave energy field created by energy discharged by a launcher) as it moves through the microwave heating chamber 330 can be at least about 2, at least about 3, at least about 4, at least about 5, at least about 6, or at least about 7 times and/or not more than 12, not more than about 10, not more than about 9, not more than about 8, or not more than about 6 times. For each passage by the launcher, an amount of microwave energy within one or more of the above ranges may be discharged from at least one of the microwave launchers 324.

Additionally, or in the alternative, the microwave heating zone 316 may also include at least two launchers positioned on opposite sides of the microwave chamber, such as, for example, launchers 324*a* and lower launchers 324*b* shown in FIG. 13. These opposed, or oppositely disposed, launchers may be oppositely facing, such that launch openings of the launchers are substantially aligned, or staggered such that the launch openings of opposed launchers are axially and/or laterally spaced from each other.

Several types of microwave launchers may be utilized in a microwave heating zone according to embodiments of the present invention. Several views of exemplary microwave launchers are provided in 14*a-e*. Turning first to FIG. 14*a*, one example of a microwave launcher 822 comprises a set of broader opposing sidewalls 832*a,b* and a set of narrower opposing end walls 834*a,b*, which collectively define a substantially rectangular launch opening 838. The launch opening 838 can have a width ($W_1$) and a depth ($D_1$) that are defined by the lower terminal edges of sidewalls 832*a,b* and end walls 834*a,b*, respectively. Views of one of sidewalls 832 and several examples of suitable end walls 834 are shown in FIG. 14*b* and FIGS. 14*c-e*, respectively.

The depth ($D_1$) of launch opening 838 is less than its width ($W_1$). When the launcher is configured to discharge microwave energy into a microwave heating chamber, the depth is typically oriented in a direction perpendicular to the direction of travel of the carriers moving through the microwave heating chamber. In other words, launch opening 838 may be elongated in the direction of travel of the carriers (or the direction of extension of the microwave chamber), so that the width of the launcher defined by the longer terminal edges of the sidewalls 832*a,b* are oriented parallel to the direction of travel (or the direction of extension), while the depth of the launcher defined by the shorter terminal edges of the end walls 834*a,b* are aligned substantially perpendicular to the direction of travel (or extension).

Figure 14C:
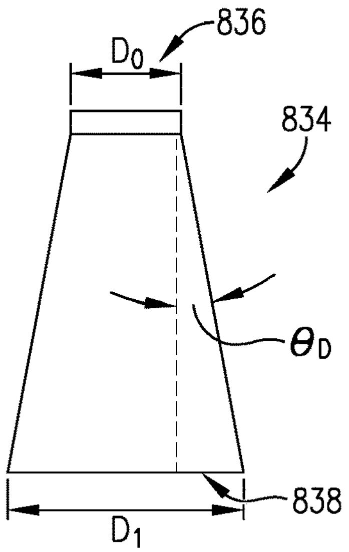
Figure 14D:
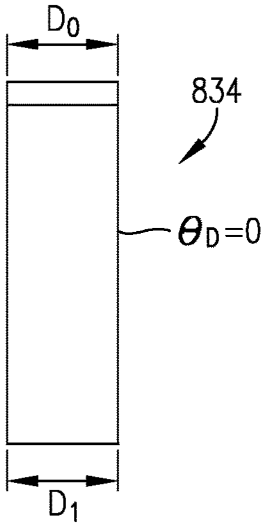
Figure 14E:
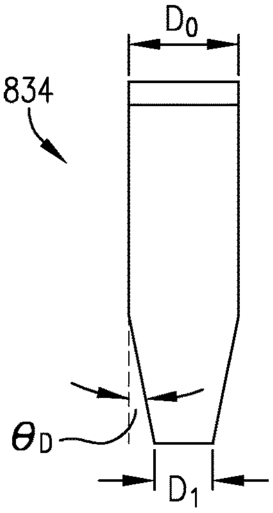

Optionally, at least one of the pair of sidewalls 832*a,b* and the pair of end walls 834*a,b* can be flared such that at least one dimension of the microwave launcher inlet 836 (width $W_0$ or depth $D_0$) is smaller than the corresponding outlet dimension (width $W_1$ or depth $D_1$), as respectively illustrated in FIGS. 14*b* and 14*c*. If flared, the side and/or end walls define respective width and depth flare angles, $\theta_w$ and $\theta_d$, as shown in FIGS. 14*b* and 14*c*. The width and/or depth flare angles $\theta_w$ and/or $\theta_d$ can be at least about 2°, at least about 5°, at least about 10°, or at least about 15° and/or not more than about 45°, not more than about 30°, or not more than about 15°. When present, the values for the width and depth flare angles $\theta_w$ and $\theta_d$ can be the same, or each of $\theta_w$ and $\theta_d$ may have a different value. In some cases, the end walls 838*a,b* of the microwave launcher 822 may have a depth flare angle $\theta_d$ that is smaller than the width flare angle $\theta_w$. For example, the depth flare angle $\theta_d$ can be not more than about 0°, such that the inlet depth Do and the outlet dimension $D_1$ of microwave launcher 822 are substantially the same, as shown in FIG. 14*d*, or the depth flare angle $\theta_d$ may be less than 0°, such that $D_1$ is smaller than $D_0$, as shown in FIG. 14*e*.

In some cases, the microwave launcher used to direct microwave energy toward the articles passing through the microwave heating zone may include a single microwave inlet and two or more launch openings. One example of such a microwave launcher, shown as launcher 922, is provided in FIGS. 15 and 16, below. Microwave launcher 922 includes an inlet 936 and first, second, and third spaced-apart launch openings 938*a-c*, which are laterally spaced from one another. Although shown as including three openings, it should be understood that similar microwave launchers having only two or four or more launch openings may also be used. The spacing between adjacent launch openings, shown as dimensions $x_1$ and $x_2$ in FIG. 17, can be at least about 0.25 inches, at least about 0.35 inches, or at least about 0.45 inches and/or not more than about 1 inch, not more than about 0.85 inches, not more than about 0.80 inches, not more than about 0.75, not more than about 0.70 inches, or not more than about 0.65 inches.

Expressed in terms of the wavelength of the predominant mode of microwave energy introduced into the heating chamber (λ), the launch openings, such as those shown in FIGS. 15-17 as launch openings 938*a-c*, may be spaced apart from one another by at least about 0.05 λ, at least about 0.075 λ, at least about 0.10 λ and/or not more than about 0.25 λ, not more than about 0.20 λ, or not more than about 0.15 λ. When the microwave launcher 922 includes two or more launch openings 938*a-c*, it may also include at least one dividing septum 940*a,b* disposed within the interior of the launcher and having a thickness at its terminal end equal to the desired spacing between the discharge openings 938*a-c*. Although shown in FIGS. 15 and 16 as having a generally constant thickness, the thickness of each septum may vary along its length, or longest dimension, between the inlet and outlet of the microwave launcher 922, as generally shown in FIG. 17.

When the microwave launcher 922 comprises multiple launch openings 938*a-c*, each opening can define a depth, shown as $d_1$ through $d_3$ in FIGS. 15 and 16. The depth of each launch opening 938*a-c* can be the same, or one or more may be different. The depth of each opening 938*a-c* can be, for example, at least about 1.5, at least about 2, at least about 2.5, at least about 2.75, at least about 3, or at least about 3.25 inches and/or not more than about 5, not more than about 4.5, not more than about 4, or not more than about 3.5 inches. When expressed in terms of the wavelength of the predominant mode of microwave energy introduced into the microwave heating chamber (λ), the launch openings 938*a-c* may have a depth of not more than about 0.625 λ, not more than about 0.50 λ, not more than about 0.45 λ, not more than about 0.35 λ, or not more than about 0.25 λ. Depending on the specific configuration of the microwave launcher 922, one or more of the launch openings 938*a-c* may have a depth greater than, less than, or equal to the depth of the microwave inlet 936. It should be understood that the depths of each launch opening 938*a-c* does not include the thickness of the septa 940*a,b*, when present.

The launch opening or openings defined by one or more microwave launchers used in the present invention may be at least partially covered by a substantially microwave-transparent window for fluidly isolating the microwave heating chamber from the microwave launcher. The microwave transparent windows, when present, may prevent fluid flow between microwave chamber and the microwave launchers, while still permitting a substantial portion of the microwave energy from the launchers to pass therethrough and into the microwave chamber. The windows may be formed of any suitable material, including, but not limited to, one or more thermoplastic or glass material such as glass-filled Teflon, polytetrafluoroethylene (PTFE), poly(methyl methacrylate (PMMA), polyetherimide (PEI), aluminum oxide, glass, and combinations thereof. The average thickness of each window may be at least about 4 mm, at least about 6 mm, at least about 8 mm, or at least about 10 mm and/or not more than about 20 mm, not more than about 16 mm, or not more than about 12 mm. Each window may be able to withstand a pressure difference of at least about 40 psig, at least about 50 psig, at least about 75 psi and/or not more than about 200 psig, not more than about 150 psig, or not more than about 120 psi without breaking, cracking, or otherwise failing.

As discussed previously, it has been found that utilizing articles having a larger width, as compared to conventionally-sized articles, has provided unique and unexpected benefits, particularly in terms of enhanced uniformity of heating. Additionally, it has been found that adjusting the article and/or carrier to have certain dimensions relative to the dimensions of one or more launch openings provides further benefits in terms of uniform heating and a more uniform microbial lethality. Some of these dimensions illustrated shown in FIGS. 17 and 18.

Turning now to FIG. 17, a partial cross-sectional view of one configuration of a microwave launcher and an article-loaded carrier is shown. As shown in FIG. 17, a carrier 912 loaded with articles 950 arranged in two side-by-side rows and positioned underneath a microwave launcher 922, which includes three microwave launch openings 938*a-c*. Such a configuration may occur when, for example, the carrier 912 is passing through a microwave heating chamber (not shown). Although shown as including only two side-by-side rows of articles, it should be understood that the carrier 912 can include any suitable number of rows of articles, with the launcher 922 and carrier 912 having any suitable width in order to accommodate the articles, while still having dimensions and relative dimensions that fall within one or more of the ranges discussed herein.

When the articles are arranged in two or more rows within the carrier cargo space, adjacent rows may be spaced apart from one another such that the distance between side-by-side articles in adjacent rows may be at least 0.5 inches, at least about 1 inch, at least about 1.5, at least about 2, at least about 2.5, at least about 3.5, at least about 4.5, at least about 4.75, at least about 4.8, at least about 4.85, or at least about 4.9 inches apart and/or not more than about 10, not more than about 8, not more than about 7, not more than about 6.5, not more than about 6, not more than about 5.85, not more than about 5.75, or not more than about 5.6 inches apart, measured between the geometric center points of adjacent articles, as shown as dimension Dc in FIG. 17. Depending, in part, on the width of the articles (W), the spacing between adjacent edges of side-by-side articles, shown as dimension Si in FIG. 17, can be at least about 0.25 inches, at least about 0.30 inches, at least about 0.45 inches and/or not more than about 1 inch, not more than about 0.75 inches, or not more than about 0.55 inches.

Although not shown in FIG. 17, the side-by-side articles in adjacent rows can be separated by at least one divider. Alternatively, no divider may be present. When present, the divider may be in contact with the edges of the articles, such that the width of the divider falls within one or more of the ranges for spacing between adjacent edges of side-by-side articles described previously.

In some embodiments, the ratio of the distance between the center points of side-by-side articles 950 in adjacent rows in a carrier, shown as Dc in FIG. 17, to the width of the cargo volume of the carrier, shown as dimension $W_c$ in FIG. 17, may be at least 0.53:1, at least 0.54:1, at least about 0.55:1, at least about 0.56:1, or at least about 0.57:1. In some cases, this ratio may be not more than about 0.70:1, not more than about 0.65:1, not more than about 0.62:1, or not more than about 0.60:1. Additionally, the distance between center points of side-by-side articles 950 in adjacent rows in the carrier 912 expressed in terms of the wavelength of the predominant mode of microwave energy introduced into the microwave chamber can be at least about 3.10 λ, at least about 3.15 λ, at least about 3.20 λ, at least about 3.25 λ, at least about 3.30 λ, at least about 3.35 Å, or at least about 3.40 λ and/or not more than about 4.0 λ, not more than about 3.75 λ, not more than about 3.70 λ, not more than about 3.65 λ, or not more than about 3.60 λ.

Additionally, it has been found that articles having a width, shown as W in FIG. 18, that is at least about 1.25, at least about 1.27, at least about 1.30, at least about 1.32, at least about 1.35, at least about 1.37, at least about 1.40, or at least about 1.42 times the depth of each of the launch openings, shown as $d_1$ through $d_3$ in FIG. 17, facilitate more uniform heating of the contents of the articles. It should be understood that when the microwave launcher 922 has multiple launch openings 938*a-c*, the ratios provided herein apply to each of the openings individually, whether the openings each have a depth that is the same as, or different than, the depths of one or more other launch openings. The ratio of the width (W) of each article 950 to the depth of each of the launch openings 938*a-c*, shown as $d_1$ through $d_3$ in FIGS. 16 and 17, can be not more than about 2:1, not more than about 1.95:1, not more than about 1.90:1, not more than about 1.85:1, not more than about 1.80:1, not more than about 1.75:1, or not more than about 1.70:1.

In some embodiments, the ratio of the width of the cargo volume of the carrier 912, shown as $W_c$ in FIG. 17, to the depth of each of the launch openings 938*a-c*, shown as $d_1$ through $d_3$ in FIG. 17, can be at least about 2.75:1, at least about 2.80:1, at least about 2.85:1, at least about 2.90:1, at least about 2.95:1, at least about 3.0:1, at least about 3.05:1, at least about 3.10:1, at least about 3.15:1, at least about 3.20:1, at least about 3.25:1, at least about 3.30:1, at least about 3.35:1, at least about 3.40:1, at least about 3.45:1, or at least about 3.50:1. Additionally, or in the alternative, the ratio of the width of the cargo volume of the carrier to the depth of each of the launch openings 938*a-c* can be not more than about 4.2:1, not more than about 4.1:1, not more than about 4:1, not more than about 3.95:1, not more than about 3.9:1, not more than about 3.85:1, not more than about 3.8:1, not more than about 3.75:1, not more than about 3.7:1, not more than about 3.65:1, or not more than about 3.6:1.

When the cargo volume of the carrier 912 is separated into two or more individual compartments by at least one divider (not shown in FIGS. 17 and 18), the ratio of the width of each individual compartment to the depth of each launch opening 938*a-c*, shown as $d_1$ through $d_3$ in FIG. 17, can be at least about 1.87:1, at least about 1.90:1, at least about 1.95:1, at least about 2.0:1, at least about 2.05:1, at least about 2.10:1, at least about 2.15:1, at least about 2.20:1, at least about 2.25:1, at least about 2.30:1, or at least about 2.32:1. Additionally, or in the alternative, the ratio of the width of each individual compartment to the depth of each launch opening 938*a-c* can be not more than about 2.80:1, not more than about 2.75:1, not more than about 2.70:1, not more than about 2.65:1, not more than about 2.6:1, not more than about 2.55:1, not more than about 2.5:1, not more than about 2.45:1, not more than about 2.4:1, not more than about 2.35:1.

Referring again to FIGS. 11*a* and 11*b*, as the carrier passes through the microwave heating zone 116, the articles may be heated so that the coldest portion of the articles achieves a target temperature. When the microwave heating system is a sterilization or pasteurization system, the target temperature can be a sterilization or pasteurization target temperature of at least about 65° C., at least about 70° C., at least about 75° C., at least about 80° C., at least about 85° C., at least about 90° C., at least about 95° C., at least about 100° C., at least about 105° C., at least about 110° C., at least about 115° C., at least about 120° C., at least about 121° C., at least about 122° C. and/or not more than about 130° C., not more than about 128° C., not more than about 126° C., not more than about 125° C., not more than about 122° C., not more than about 120° C., not more than about 115° C., not more than about 110° C., not more than about 105° C., not more than about 100° C., or not more than about 95° C.

The microwave heating chamber in the microwave heating zone 116 may be at least partially liquid filled and at least a portion, or all, of the articles in the carrier may be submerged in the liquid medium during heating. The average bulk temperature of the liquid in the microwave heating chamber may vary and, in some cases, can depend on the amount of microwave energy discharged into the microwave heating chamber. The average bulk temperature of the liquid in the microwave heating chamber can be at least about 70° C., at least about 75° C., at least about 80° C., at least about 85° C., at least about 90° C., at least about 95° C., at least about 100° C., at least about 105° C., at least about 110° C., at least about 115° C., or at least about 120° C. and/or not more than about 135°, not more than about 132° C., not more than about 130° C., not more than about 127° C., or not more than about 125° C. In some cases, the liquid in the microwave heating chamber may be continually heated via one or more heat exchangers (not shown) and the temperature may remain generally constant such that, for example, it stays within about 2° C., within about 5° C., within about 7° C., or within less than 10° C. of a predetermined set point. In other cases, the liquid may not be heated or cooled by another source and its temperature may change by at least 10° C., at least about 12°, at least about 15°, at least about 20° C., or at least about 25° C. during the microwave heating step.

As the carrier passes through the microwave heating chamber, the articles may be heated to the target temperature in a relatively short period of time, which can help minimize any thermally-caused damage or degradation of the articles. For example, the average residence time of each article passing through the microwave heating zone 116 can be at least about 5 seconds, at least about 20 seconds, at least about 60 seconds and/or not more than about 10 minutes, not more than about 8 minutes, not more than about 5 minutes, not more than about 3 minutes, not more than about 2 minutes, or not more than about 1 minute. The minimum temperature of the articles heated in the microwave heating zone 116 can increase by at least about 10° C., at least about 20° C., at least about 30° C., at least about 40° C., at least about 50° C., at least about 75° C. and/or not more than about 150° C., not more than about 125° C., or not more than about 100° C., and the heating may be performed at a rate of at least about 5° C./min, at least about 10° C./min, at least about 15° C. per minute (° C./min), at least about 25° C./min, at least about 35° C./min and/or not more than about 75° C./min, not more than about 50° C./min, not more than about 40° C./min, not more than about 30° C./min, or not more than about 20° C./min.

The microwave heating chamber can be operated at approximately ambient pressure. Alternatively, it may be a pressurized microwave chamber that operates at a pressure that is at least 5 psig, at least about 10 psig, at least about 15 psig, or at least about 17 psig and/or not more than about 80 psig, not more than about 60 psig, not more than about 50 psig, or not more than about 40 psig above ambient pressure. As used herein, the term "ambient" pressure refers to the pressure exerted by the fluid in the microwave heating chamber without the influence of external pressurization devices.

In some embodiments of the present invention, upon exiting the microwave heating zone, the loaded carrier may be passed to a holding zone, wherein the temperature of the articles can be maintained at or above a certain target temperature for a predetermined period of time. For example, in the holding zone, the temperature of the coldest part of the article can be held at a temperature at or above a predetermined minimum temperature of at least about 70° C., at least about 75° C., at least about 80° C., at least about 85° C., at least about 90° C., at least about 95° C., at least about 100° C., at least about 105° C., at least about 110° C., at least about 115° C., or at least about 120° C., at least about 121° C., at least about 122° C. and/or not more than about 130° C., not more than about 128° C., or not more than about 126° C., for a period of time (or "hold period") of at least about 1 minute, at least about 2 minutes, or at least about 4 minutes and/or not more than about 20 minutes, not more than about 16 minutes, or not more than about 10 minutes. In other embodiments, the loaded carriers exiting the microwave heating zone may be passed directly into the quench zone 122.

Once the heated articles exit the holding zone 120, when present, or the microwave heating zone 116, when no holding zone is present, the carrier may be introduced into a quench zone 122, wherein the articles may be cooled as rapidly as possible via submersion in a cooled fluid. The quench zone 122 may be configured to reduce the external surface temperature of the articles by at least about 30° C., at least about 40° C., at least about 50° C. and/or not more than about 100° C., not more than about 75° C., or not more than about 50° C. in a time period of at least about 1 minute, at least about 2 minutes, at least about 3 minutes and/or not more than about 10 minutes, not more than about 8 minutes, or not more than about 6 minutes. Any suitable fluid may be used in the quench zone 122 and, in some cases, the fluid may include a liquid similar to, or different than, the liquid used in the microwave heating zone 116 and/or the holding zone 120 (when present). When removed from the quench zone 122, the cooled articles can have a temperature of at least about 20° C., at least about 25° C., at least about 30° C. and/or not more than about 70° C., not more than about 60° C., or not more than about 50° C. In some embodiments, at least a portion of quench zone 122 can be pressurized, such that it is operated at a pressure of at least about 10, at least about 15, at least about 20, or at least about 25 psig and/or not more than about 100, not more than about 50, not more than about 40, or not more than about 30 psig above ambient pressure in the quench chamber. Once removed from quench zone 122, the cooled, treated articles can then be removed from the microwave heating system for subsequent storage or use.

As discussed previously, it has been discovered that utilizing articles, carriers, and microwave launchers having specific relative dimensions as discussed herein results in more uniformly heated articles. Such articles, when removed from the heating system, include products that exhibit fewer hot and cold spots and have a uniform microbial lethality.

For example, an article heated as described herein may exhibit a smaller difference in temperature between its hottest and coldest portions as the article is removed from the holding zone 120 (when present) or from the microwave heating zone 116 (when no holding zone is present). In some cases, the difference between the maximum temperature achieved by the hottest portion of each article withdrawn from the holding zone 120 (or the microwave heating zone 116) and the minimum temperature of the coldest portion of the same article is not more than 20° C., not more than about 17° C., not more than about 15° C., not more than about 12° C., not more than about 10° C., not more than about 8° C., or not more than about 5° C. Additionally, the difference between the maximum temperature of all of the hottest portions of the articles in a single carrier withdrawn from the holding zone 120 (or microwave heating zone 116) and the minimum temperature of all of the coldest portions of the articles in the same carrier is not more than 30° C., not more than about 27° C., not more than about 25° C., not more than about 22° C., not more than about 20° C., not more than about 17° C., not more than about 15° C., not more than about 12° C., or not more than about 10° C. The former temperature difference indicates more uniform heating of each individual article, while the latter temperature difference is indicative of a more uniform heating of multiple articles within a carrier.

In some cases, the temperature of the hottest portion of the articles is not more than about 135° C., not more than about 133° C., not more than about 130° C., not more than about 127° C., or not more than about 125° C. The temperature of the coldest portion of each article may be at least about 119° C., at least about 120° C., at least about 121° C., at least about 123° C. and/or not more than about 134° C., not more than about 133° C., not more than about 132° C., or not more than about 131° C. In other cases, the temperature of the hottest portion of the articles may be at least about 75° C., at least about 80° C., or at least about 85° C. and/or not more than about 120° C., not more than about 115° C., not more than about 110° C., not more than about 105° C., not more than about 100° C., or not more than about 95° C.

Additionally, articles removed from the holding zone 120 (or from the microwave heating zone 116 when no holding zone is present) exhibit higher and/or a more consistent microbial lethality than articles processed by other systems. For example, when the system is used for sterilization, the coldest portions of each article can achieve a minimum microbial lethality ($F_0$) of *Clostridium botulinum*, measured at 250° F. (121.1° C.) with a z value of 18° F., of, of least about 1 minute, at least about 1.5 minutes, at least about 1.75 minutes, at least about 2 minutes, at least about 2.25 minutes, at least about 2.5 minutes, at least about 2.75 minutes, at least about 3 minutes, at least about 3.25 minutes, or at least about 3.5 minutes and/or not more than about 10 minutes, not more than about 8 minutes, not more than about 6 minutes, not more than about 4 minutes, not more than about 3.75 minutes, not more than about 3.5 minutes, not more than about 3.25 minutes, not more than about 3 minutes, not more than about 2.75 minutes, not more than about 2.5 minutes, not more than about 2.25 minutes, or not more than about 2 minutes.

When the system is used for pasteurization, the coldest portion of each article can achieve a microbial lethality (F) of *Salmonella* or *Escherichia coli* (depending on the food being pasteurized), measured at 90° C. with a z value of 6° C., of at least about 5 minutes, at least about 5.5 minutes, at least about 6 minutes, at least about 6.5 minutes, at least about 7 minutes, at least about 7.5 minutes, at least about 8 minutes, at least about 8.5 minutes, at least about 9 minutes, at least about 9.5 minutes, at least about 10 minutes, at least about 10.5 minutes, at least about 11 minutes, or at least about 11.5 minutes. Alternatively, or in addition, the microbial lethality of *Salmonella* or *E. coli* can be not more than about 20 minutes, not more than about 19 minutes, not more than about 18 minutes, not more than about 17 minutes, or not more than about 16 minutes, measured according to ASTM F-1168-88(1994).

The standard deviation (measured amongst several similar trials utilizing identical or nearly-identical articles) of the minimum $F_0$ value measured at the coldest portion of the coldest sterilized article may be not more than about 2.0, not more than about 1.75, not more than about 1.5, or not more than about 1.25 minutes. Additionally, the maximum microbial lethality, $F_{0max}$, measured at the hottest portion of the hottest sterilized article can be not more than 12 times, not more than about 10 times, or not more than about 8 times higher than the minimum $F_0$ for the same trial. microbial lethality. Similar deviations may be expected amongst several similar trials when the articles are pasteurized.

Microwave heating systems of the present invention can be commercial-scale heating systems capable of processing a large volume of articles in a relatively short time. In contrast to conventional retorts and other small-scale systems that utilize microwave energy to heat a plurality of articles, microwave heating systems as described herein can be configured to achieve an overall production rate of at least about 10 packages per minute, at least about 15 packages per minute per convey line, at least about 20 packages per minute, at least about 25 packages per minute, or at least about 30 packages per minute per convey line, measured as described in the '516 Application.

DEFINITIONS

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "including," "includes," and "include" have the same open-ended meaning as "comprising," "comprises," and "comprise."

As used herein, the terms "having," "has," and "have" have the same open-ended meaning as "comprising," "comprises," and "comprise."

As used herein, the terms "containing," "contains," and "contain" have the same open-ended meaning as "comprising," "comprises," and "comprise."

As used herein, the terms "a," "an," "the," and "said" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

EXAMPLE

Several trials were conducted in which sealed trays filled with a combination of noodles and a sauce were subjected to heating in a microwave heating in a lab-scale system as described herein. The microwave heating system included a thermalization zone, a microwave heating zone, a holding zone, and a cooling zone, which were all substantially filled with purified water.

The microwave heating zone included a single pair of opposed microwave launchers each having three openings and configured in a similar manner as shown in FIGS. 15 and 16. The width (longer dimension) of each launch opening was aligned parallel to the length of the carrier in the microwave heating zone. The depth of each of the outer openings, shown as $d_1$ and $d_3$ in FIG. 16, was 3.5 inches and the depth of the middle opening, shown as $d_2$ in FIG. 16, was 3.0 inches. Each of the two septa disposed within the launcher at least partially forming each of the openings had a width of 0.625 inches.

Containers formed from multi-layered polypropylene of different sizes and shapes were filled with either a combination of 30 weight percent egg white pasta noodles and 70 weight percent cheese sauce or a combination of 26 weight percent cheese tortellini and 74 weight percent red sauce. A summary of the properties of each of the different packaged foodstuffs used during the heating trials are summarized in Table 1, below.

TABLE 1

Summary of Packaged Foodstuffs

| Package Type | Container Length, in. | Container Width, in. | Container Volume, oz. | Shape | Contents Noodle | Contents Sauce |
|---|---|---|---|---|---|---|
| C-1 | 6 | 4.3 | 10.5 | Rectangular | egg white pasta | cheese sauce |
| I-1 | 5.075 | 5.075 | 11.3 | Square | egg white pasta | cheese sauce |
| I-2 | 5.075 | 5.075 | 11.3 | Square | cheese tortellini | red sauce |
| I-3 | 6.735 | 5.075 | 13.3 | Rectangular | cheese tortellini | red sauce |

For each heating trial, several packaged foodstuffs of a single type were loaded into one of the three carriers, the dimensions and orientation of which are summarized in Table 2, below. The packages loaded into each carrier were arranged in a nested configuration (e.g., a top-up, top-down configuration) and were spaced apart from one another by dividers. The width of the dividers used in each carrier (Carrier A through C) are summarized in Table 2, below, along with the distance between the center points of adjacent packages in side-by-side rows (CP-to-CP). Additionally, each of the carriers utilized metallic slats as part of the upper and lower groups of support members holding the articles within the cargo volume.

TABLE 2

Summary of Carrier Dimensions

| Carrier Type | Design | Cargo Volume Dimensions Width, in | Cargo Volume Dimensions Height, in | Divider Width, in | CP-to-CP Distance, in | Metallic Slats? |
|---|---|---|---|---|---|---|
| A | Fixed | 9.5 | 1.5 | 0.625 | 5.702 | Yes |
| B | Fixed | 10.4375 | 1.5 | 0.4375 | 5.5125 | Yes |
| C | Adjustable | 10.5 | 1.5 | 0.50 | 5.575 | Yes |

Once the articles were placed in a carrier and secured, the loaded carrier was introduced into the thermalization zone of the microwave heating system. The carrier was moved along a convey line at an average speed of between 2.5 to 2.8 inches per second, and the average bulk temperature of the water in the thermalization zone was between 65° C. to 85° C. The total residence time of each loaded carrier in the thermalization zone was 35 minutes.

After being preheated in the thermalization zone, the loaded carrier was passed into the microwave heating zone. In some trials, the temperature of the liquid medium in the microwave heating zone remained generally constant at around 121° C., while in other trials, the temperature was permitted to fluctuate and generally ranged from about 95° C. to about 125° C. The pressure of the microwave heating zone was 50 psig above the ambient pressure of the liquid medium. During the heating step, each carrier was subjected to a specific heating profile that included passing the carrier by the microwave launchers a total of four times and discharging a predetermined amount of microwave energy from the launcher during each pass. An effective dwell time of about 6 seconds was permitted between each passage. A summary of the particular heating profiles for each of these runs is provided in Tables 3a and 3b, below.

After being heated, the articles remained submerged in a heated liquid having an average bulk temperature of between about 121° C. to about 125° C. for a hold time. The total hold time ranged from 10 minutes to 15.5 minutes. After the holding step, the carrier was passed to a pressurized quench zone, wherein the articles were cooled by contact with water having an average bulk temperature between 35° C. and 40° C. The pressure of the cooling zone was 50 psig above the ambient pressure of the water.

Upon removal from the quench zone, the articles were removed from the carrier and the microbial lethality ($F_0$) was measured for several articles in various locations. For example, the microbial lethality of some articles was measured at the portion of the article that had achieved the highest temperature during the heating run, while the microbial lethality of other articles was measured at the portion of the article that had achieved the minimum temperature during the heating run. The $F_0$ value measured at the cold spots (min. $F_0$) provided information on the minimum microbial lethality exhibited by the articles in a given run, while the $F_0$ value measured at the hot spots (max. $F_0$) indicated the maximum lethality (which can indicate over processing) achieved by articles in the same run. Smaller ratios of maximum $F_0$, determined at a hottest measured hot spot, to minimum $F_0$, determined at the coldest measured cold spot, indicate a more uniform microbial lethality amongst all samples in a run.

A summary of the specific conditions under which each trial was performed, as well as the results for each trial, are respectively summarized in Tables 4 through 6, below. FIGS. 19*a-c*, provided below, show the numbering and relative position for each package in each of the trials. The measured microbial lethality for each package provided in Table 5 below was measured at a cold spot of the package, except for the packages listed in Table 6. For each trial, the microbial lethality for the packages numbered as shown in FIGS. 19*a-c* and listed in Table 6, were measured at a hot spot of the article. The ratios of maximum $F_0$ to minimum $F_0$ summarized in Table 5 was calculated as the ratio of the highest $F_0$ to the lowest $F_0$ measured for a given trial.

TABLE 3a

Summary of Heating Profiles

| Heating Profile | # of Microwave Passes | Energy Discharged per Pass, kW 1 | 2 | 3 | 4 | 5 | 6 | 7 | 8 | Total Energy Discharged (kW) | Effective Dwell Time (s) |
|---|---|---|---|---|---|---|---|---|---|---|---|
| 1 | 6 | 20 | 15 | 15 | 15 | 10 | 5 | — | — | 80 | 6 |
| 2 | 6 | 10 | 10 | 10 | 10 | 5 | 5 | — | — | 50 | 6 |
| 3 | 8 | 10 | 10 | 5 | 5 | 5 | 5 | 5 | 5 | 50 | 6 |
| 4 | 8 | 10 | 10 | 10 | 10 | 5 | 5 | 5 | 5 | 60 | 6 |
| 5 | 8 | 10 | 10 | 10 | 10 | 10 | 10 | 10 | 10 | 80 | 6 |

TABLE 3b

Summary of Water Temperature in Microwave Heating Zone

| Heating Profile | Water Temperature per Pass, ° C. 1 | 2 | 3 | 4 | 5 | 6 | 7 | 8 |
|---|---|---|---|---|---|---|---|---|
| 1 | 121.1 | 121.1 | 121.1 | 121.1 | 121.1 | 121.1 | — | — |
| 2 | 121.1 | 121.1 | 121.1 | 121.1 | 121.1 | 121.1 | — | — |
| 3 | 95 | 105 | 110 | 115 | 118 | 121 | 123 | 125 |
| 4 | 95 | 105 | 110 | 115 | 118 | 121 | 123 | 125 |
| 5 | 95 | 105 | 110 | 115 | 118 | 121 | 123 | 125 |

TABLE 4

Summary of Conditions for Heating Trials

| Trial | Package Type | Carrier Type | Belt Speed, in/s | Thermalization Temperature, ° C. | Heating Profile | Holding Temperature, ° C. | Holding Time, min | Cooling Water Temp., ° C. |
|---|---|---|---|---|---|---|---|---|
| 1 | C-1 | A | 2.5 | 65 | 1 | 125 | 10 | 35 |
| 2 | C-1 | A | 2.5 | 65 | 1 | 125 | 10 | 35 |
| 3 | I-1 | B | 2.5 | 65 | 2 | 125 | 10 | 35 |
| 4 | I-1 | B | 2.5 | 65 | 2 | 125 | 10 | 35 |
| 5 | I-1 | B | 2.8 | 85 | 3 | 125 | 10 | 35 |
| 6 | I-1 | B | 2.8 | 85 | 3 | 125 | 10 | 35 |
| 7 | I-2 | B | 2.8 | 85 | 4 | 125 | 10 | 35 |
| 8 | I-2 | B | 2.8 | 85 | 4 | 125 | 10 | 35 |
| 9 | I-2 | C | 2.8 | 85 | 4 | 125 | 10 | 35 |

TABLE 4-continued

| Summary of Conditions for Heating Trials | | | | | | | | |
|---|---|---|---|---|---|---|---|---|
| Trial | Package Type | Carrier Type | Belt Speed, in/s | Thermalization Temperature, ° C. | Heating Profile | Holding Temperature, ° C. | Holding Time, min | Cooling Water Temp., ° C. |
| 10 | I-2 | C | 2.8 | 85 | 4 | 125 | 10 | 35 |
| 11 | I-3 | C | 2.8 | 85 | 5 | 125 | 10 | 35 |
| 12 | I-3 | C | 2.8 | 85 | 5 | 125 | 10 | 35 |

TABLE 5

Results of Package Heating Trials

| | Measured $F_0$ per Package | | | | | | | | | | | | | | Min. | Max. | Ratio of Max $F_0$ to Min | Max. Temp., |
|---|---|---|---|---|---|---|---|---|---|---|---|---|---|---|---|---|---|---|
| Trial | 1 | 2 | 3 | 4 | 5 | 6 | 7 | 8 | 9 | 10 | 11 | 12 | 13 | 14 | $F_0$ | $F_0$ | $F_0$ | ° C. |
| 1 | 165.3 | 194.7 | 10.07 | 13.79 | — | — | — | — | — | — | — | — | — | — | 10.1 | 194.7 | 19.3 | 138.1 |
| 2 | 92.07 | 258.8 | 11.3 | 13.21 | — | — | — | — | — | — | — | — | — | — | 11.3 | 258.8 | 22.9 | 139.05 |
| 3 | 38.21 | — | — | — | — | — | 8.89 | 10.37 | 29.91 | — | — | — | — | — | 8.89 | 38.2 | 4.30 | 129.22 |
| 4 | 43.81 | — | — | — | — | — | 9.95 | 11.19 | 30.67 | — | — | — | — | — | 9.95 | 43.8 | 4.40 | 135.13 |
| 5 | 30.76 | — | — | — | — | — | 12.58 | error | 24.83 | — | — | — | — | — | 12.58 | 30.8 | 2.45 | 125.8 |
| 6 | 35.5 | — | — | — | — | — | 12.89 | 20.2 | 25.05 | — | — | — | — | — | 12.89 | 35.5 | 2.75 | 129.0 |
| 7 | — | — | — | 15.59 | — | — | 12.17 | — | 22.03 | 53.42 | — | — | — | — | 12.17 | 53.4 | 4.39 | 129.32 |
| 8 | — | — | — | 15.1 | — | — | 12.61 | — | 24.35 | 46.02 | — | — | — | — | 12.61 | 46.02 | 3.65 | 127.48 |
| 9 | — | 35.05 | — | 9.83 | — | 12.41 | 14.03 | — | — | 14.83 | — | — | — | 20.47 | 9.83 | 35.05 | 3.57 | 126.19 |
| 10 | 35.63 | — | — | 14.09 | — | — | — | — | — | 17.62 | — | — | — | 26.76 | 14.1 | 35.6 | 2.53 | 126.32 |
| 11 | 38.35 | 26.58 | — | 10.58 | 11.44 | 7.54 | 10.86 | 11.64 | 26.75 | 37.31 | — | — | — | — | 7.54 | 38.35 | 5.01 | 126.76 |
| 12 | 53.29 | 20.8 | 11.23 | 15.25 | 11.51 | 10.01 | 9.85 | 15 | 20.48 | 50.55 | | | | | 9.85 | 53.29 | 5.41 | 129.08 |

TABLE 6

| Summary of Hot Spot Locations | |
|---|---|
| Trial | Package(s) with Hot Spot |
| 1 | 1, 2 |
| 2 | 1, 2 |
| 3 | 1, 9 |
| 4 | 1, 9 |
| 5 | 1, 9 |
| 6 | 1, 9 |
| 7 | 9, 10 |
| 8 | 9, 10 |
| 9 | 2, 14 |
| 10 | 1, 14 |
| 11 | 1, 2, 9, 10 |
| 12 | 1, 2, 9, 10 |

The preferred forms of the invention described above are to be used as illustration only, and should not be used in a limiting sense to interpret the scope of the present invention. Obvious modifications to the exemplary one embodiment, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A microwave heating system for heating a plurality of articles, said microwave heating system comprising:

at least one carrier comprising a frame formed of a pair of longer spaced apart side members and a pair of shorter spaced apart end members coupled to opposite ends of and extending between said side members, and an upper support member and a lower support member coupled to said frame and defining a cargo volume therebetween, wherein said cargo volume is configured to receive a group of said articles;

a convey line for transporting said carrier in a direction of travel, wherein said side members of said carrier are configured to engage said convey line;

a microwave generator for generating microwave energy having a predominant wavelength (λ); and at least one microwave launcher for directing at least a portion of said microwave energy toward said articles in said carrier being transported along said convey line, wherein:

said microwave launcher defines one or more launch openings, wherein each of said launch openings has a width and a depth, wherein the width of each launch opening is greater than its depth, wherein said microwave launcher is configured such that the width of each launch opening is aligned substantially parallel to said direction of travel, and wherein the ratio of the width of said cargo volume to the depth of each launch opening is greater than 2.75:1, said carrier is configured to arrange said articles in at least two spaced apart rows in the cargo volume, and wherein the ratio of the width of said cargo volume to the depth of each launch opening is not more than about 4.2:1, and said carrier is configured so that said rows extends along the length of said carrier in a direction generally parallel to one another so that the articles in adjacent rows are spaced apart from one another along the width of said carrier in a side-by-side configuration, wherein the ratio of the distance between the center points of side-by-side articles in adjacent rows when loaded in said carrier to the width of said cargo volume is at least 0.52:1.

2. The microwave heating system of claim 1, wherein said carrier comprises at least one divider extending generally parallel to said side members for dividing said cargo volume into at least two side-by-side compartments each configured to receive one row of said articles, wherein each compartment has a compartment width, and wherein the ratio of the compartment width to the depth of each launch opening is in the range of from about 1.90:1 to about 2.80:1.

3. The microwave heating system of claim 1, wherein said carrier is configured to receive articles having a generally trapezoidal shape so that said articles are longer and wider at the top than at the bottom, wherein at least two of said articles in each of said rows are arranged in a nested configuration such that one article is positioned top up and an adjacent article in the same row is positioned top down and at least a portion of the adjacent articles overlap horizontally.

4. The microwave heating system of claim 3, wherein each of said articles has a length and a width, wherein the ratio of said length to said width of each article is at least 1.01:1 and not more than 1.35:1.

5. The microwave heating system of claim 1, wherein each of said articles has a length and a width, wherein the ratio of the width of each article to the depth of each launch opening is greater than 1.25:1, and wherein the ratio of the width of each article to the width of said cargo volume is at least 0.46:1.

6. The microwave heating system of claim 1, wherein each of said articles has a length and a width, wherein the width of each article is at least 2.75λ, and wherein the depth of each launch opening is not more than 0.625λ.

7. The microwave heating system of claim 1, further comprising a microwave heating chamber for receiving and heating said articles, wherein said convey line is configured to transport said articles through said microwave heating chamber, wherein said microwave heating chamber is configured to be at least partially filled with a liquid medium, further comprising at least a first and a second microwave launcher for directing at least a portion of said microwave energy into said microwave heating chamber, and further comprising a thermalization chamber located upstream of said microwave heating chamber, wherein said thermalization chamber is configured to be at least partially filled with a second liquid medium.

8. The microwave heating system of claim 7, wherein said first and said second microwave launchers are disposed on opposite sides of said microwave heating chamber.

9. The microwave heating system of claim 1, wherein said microwave heating system is configured to have an overall production rate of at least 10 packages per minute and wherein said articles comprise packaged medical fluids, medical or dental instruments, or pharmaceutical fluids.

* * * * *